(12) United States Patent
Tomioka

(10) Patent No.: US 7,085,031 B2
(45) Date of Patent: Aug. 1, 2006

(54) OPTICAL SCANNER AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/221,478

(22) Filed: Sep. 7, 2005

(65) Prior Publication Data

US 2006/0054799 A1   Mar. 16, 2006

(30) Foreign Application Priority Data

Sep. 16, 2004  (JP) ............... 2004-270051

(51) Int. Cl.
*G02B 26/08* (2006.01)

(52) U.S. Cl. .............. 359/205; 359/207; 347/244; 347/259

(58) Field of Classification Search .............. None
See application file for complete search history.

(56) References Cited

U.S. PATENT DOCUMENTS 5,757,535 A   5/1998   Ichikawa

FOREIGN PATENT DOCUMENTS

JP   9-304720 A   11/1997
JP   2001-59946 A   3/2001

*Primary Examiner*—James Phan
(74) *Attorney, Agent, or Firm*—Canon USA, Inc. Intellectual Property Division

(57) ABSTRACT

An optical scanner includes a light source (1) that emits a light beam, a light deflector (6), an incident optical system (5) that allows the light beam to impinge on the light deflector such that the width of the light beam in the main scanning direction is larger than the width of each deflecting surface of the light deflector in the main scanning direction, and a focusing optical system (8) that guides the light beam deflected by the light deflector to a surface to be scanned. The incident optical system and the focusing optical system are constructed such that aberrations occurring in the two optical systems when a light beam impinges on the surface to be scanned at an off-axis image height are asymmetrical on both sides of the center of the light beam and the directions of the aberrations are opposite to each other.

10 Claims, 15 Drawing Sheets

HEIGHT FROM OPTICAL AXIS

OPTICAL SCANNER AND IMAGE FORMING APPARATUS USING THE SAME

BACKGROUND OF THE INVENTION

1. Field of the Invention

The present invention relates to optical scanners suitable for, for example, electrophotographic image forming apparatuses such as laser beam printers, digital copiers, and multifunction printers, and also relates to image forming apparatuses using the optical scanners. In particular, the present invention relates to an optical scanner in which a light beam emitted from a light source is deflected by a polygon mirror, as a light deflector, to scan a surface to be scanned through a focusing optical system having fθ characteristics so that image information can be recorded, and also relates to an image forming apparatus using the optical scanner.

2. Description of the Related Art

In a conventional optical scanner, a light beam modulated according to image signals is emitted from a light source and is periodically deflected by a light deflector composed of, for example, a rotating polygon mirror. The light beam reflected by the polygon mirror is focused in a spot on the surface of a photosensitive recording medium by a focusing optical system having fθ characteristics to scan the surface for image recording.

In recent years, higher-speed, more compact focusing optical systems have been demanded with speed increases and size reductions being achieved in devices such as laser beam printers, digital multifunction machines, and multifunction printers.

An example of methods for increasing speed is the use of an overfilled optical system (hereinafter also referred to as OFS). In an OFS, each deflecting surface (reflective surface) of the light deflector requires only the same width as the substantial part of the incident light beam required for deflection scanning. The light deflector can therefore have a smaller diameter and more surfaces. Accordingly, the OFS is suitable for increasing speed.

The OFS, however, has the problems described below.

In the OFS, a light beam wider than the deflecting surface of the light deflector in a main scanning direction is made incident on the deflecting surface. In deflection, the portion of the light beam incident on the deflecting surface is separated and guided to a surface to be scanned. Thus, different portions of the light beam incident on the deflecting surface are used at different image heights on the surface to be scanned. For example, a light beam guided to the center of the surface to be scanned is the central portion of the light beam incident on the light deflector, and a light beam guided to a marginal area (off-axis image height) of the surface to be scanned is a marginal portion of the light beam incident on the light deflector.

If, therefore, a difference in wavefront shape, such as spherical aberration, occurs between the central portion and marginal portions of the light beam incident on the light deflector, the wavefronts of light beams guided to the marginal areas (off-axis image height) of the surface to be scanned are asymmetrical in the main scanning direction. FIG. 11 shows an example of a wavefront aberration in the light beam incident on the light deflector in the OFS.

FIG. 12A shows a wavefront aberration in a light beam separated and deflected by the light deflector at an off-axis image height in a known OFS (a wavefront aberration occurring in an incident optical system). FIG. 12B shows a wavefront aberration occurring in a focusing optical system in the OFS. In the OFS, the wavefront aberration occurring in the focusing optical system is corrected so that no wavefront aberration remains in the focusing optical system, as shown in FIG. 12B. Consequently, a wavefront aberration that is asymmetrical in the main scanning direction occurs in the overall system at the off-axis image height, as shown in FIG. 12C. That is, the known OFS disadvantageously causes coma aberration in the overall system at an off-axis image height due to, for example, spherical aberration in the incident optical system.

In addition, a focusing optical system composed of a single lens or having at least one surface having an arc shape in the main scanning direction is advantageous in terms of ease of manufacture, though a known OFS including such a focusing optical system has difficulty in completely inhibiting coma aberration occurring in the focusing optical system at all image heights. In this case, unfortunately, the known OFS causes coma aberration in the overall system because the direction of the aberration occurring in the focusing optical system is the same as that of the aberration occurring in the incident optical system.

FIGS. 13A, 13B, and 13C show wavefront aberrations caused in the main scanning direction at an off-axis image height by the incident optical system, the focusing optical system, and the overall system, respectively, in a known OFS including a focusing optical system composed of a single lens.

FIGS. 13A and 13B show that the direction of coma aberration due to, for example, spherical aberration in the incident optical system at an off-axis image height is the same as that of coma aberration that cannot be inhibited in the focusing optical system at the off-axis image height. The wavefront aberrations occurring in the incident optical system and the focusing optical system at the off-axis image height combine with each other to cause coma aberration in the overall system at the off-axis image height, as shown in FIG. 13C.

Coma aberrations as shown in FIGS. 12C and 13C tend to cause a spot with a side lobe on a surface to be scanned. FIG. 14 is a diagram illustrating a spot profile at an off-axis image height in a known OFS. FIG. 14 shows that a side lobe occurs in the main scanning direction.

In FIGS. 12C and 13C, additionally, the wavefront aberrations at the off-axis image height in the known OFS are curved. The focal position for the curved wavefront aberrations deviates from that for a reference sphere depending on the amount of curvature of the wavefront aberrations. Because the amount of curvature varies with the image height in the known OFS, a difference in focal position between image heights, namely field curvature, occurs on the surface to be scanned, thus disadvantageously expanding the diameter of beam spots.

Side lobes and expanded beam spots may have adverse effects on images written on the surface to be scanned, such as decreased resolution and expanded fine lines.

Various optical scanners have been proposed to solve the above problems.

According to Japanese Patent Laid-Open No. 2001-59946 (no corresponding foreign publication), a collimating lens part for collimating a light beam emitted from a light source is composed of a plurality of lenses or an aspherical lens to inhibit spherical aberration due to the collimating lens itself and thus excellently correct field curvature.

According to the above publication, however, the number of lenses used for the collimating lens part must be increased to inhibit the spherical aberration at the collimating lens part.

Alternatively, the accuracy of the surface shape and attachment of the aspherical lens used must be improved. The use of the aspherical lens therefore tends to result in a complicated (costly) incident optical system. In particular, a larger spherical aberration occurs as the F-number (Fno) on the incident side of a focusing optical system in the main scanning direction is reduced to increase coupling efficiency and thus achieve a higher scanning speed. The number of lenses used must therefore be increased to inhibit the spherical aberration. This tends to result in a complicated (costly) incident optical system.

A double-pass structure is employed to provide a compact focusing optical system. In this structure, both a light beam incident on a deflecting surface of a light deflector and a light beam deflected by the deflecting surface pass through at least one of the lenses constituting a focusing optical system. The double-pass structure also causes aberration when a light beam traveling toward the light deflector passes through the lens. In particular, a larger wavefront aberration tends to occur if the focusing optical system (fθ lens) has a non-arc generating line in the main scanning direction to reduce the optical pass length of the focusing optical system. The double-pass structure therefore has difficulty in completely correcting the wavefront aberration occurring in the incident optical system in the main scanning direction. This tends to cause difficulty in providing excellent spots.

According to the above publication, additionally, the focusing optical system is composed of a single fθ lens because such a system is advantageous in terms of ease of manufacture. In this case, however, the focusing optical system has difficulty in inhibiting the aberration due to the system itself and, for example, no consideration is given to the occurrence of coma aberration. Consequently, even if the spherical aberration in the incident optical system is completely inhibited, coma aberration that cannot be inhibited in the focusing optical system leads to coma aberration in the overall system. This optical scanner therefore has a tendency to fail to provide excellent spots.

U.S. Pat. No. 5,757,535 (Japanese Patent Laid-Open No. 9-304720) is aimed at reducing a side lobe, which is caused by the asymmetrical light intensity distribution in the main scanning direction of a light beam deflected and separated by a deflecting surface of a light deflector at an off-axis image height. According to this publication, a side lobe is reduced by replacing a collimating lens with an aspherical optical component that allows a light beam to exit with the wavefront thereof deviating from a reference sphere with increasing height from the optical axis.

According to the above publication, however, no consideration is given to the asymmetry of the wavefront aberration of a light beam guided to an off-axis image height (marginal areas) on a surface to be scanned; the wavefront aberration is due to, for example, spherical aberration in the incident optical system. If, therefore, an asymmetrical wavefront aberration as shown in FIG. 12A occurs in the incident optical system, the asymmetrical optical component has difficulty in reducing a side lobe. FIG. 14 shows a spot profile in this case. In FIG. 14, the side lobe is not reduced. Unfortunately, therefore, this optical scanner cannot provide excellent spots.

According to the above publication, additionally, coma aberration occurs in the overall system because no consideration is given to coma aberration occurring in the focusing optical system which cannot be completely inhibited by the focusing optical system itself. Unfortunately, therefore, this optical scanner cannot reduce a side lobe and provide excellent spots.

Furthermore, field curvature cannot be completely inhibited because no consideration is given to field curvature due to differences in the amount of curvature of wavefront aberration at off-axis image heights. The diameter of spots therefore undesirably varies at off-axis image heights.

SUMMARY OF THE INVENTION

The present invention provides an optical scanner capable of providing excellent spots on a surface to be scanned and forming high-resolution, high-quality images at high speed, and further provides an image forming apparatus using the optical scanner.

An optical scanner according to the present invention includes a light source that emits a light beam; a light deflector on which the light beam impinges; an incident optical system that allows the light beam to impinge on the light deflector such that the width of the light beam incident on the light deflector in the main scanning direction is larger than the width of each deflecting surface of the light deflector in the main scanning direction; and a focusing optical system that guides the light beam deflected by the light deflector to a surface to be scanned. In this optical scanner, one or more optical surfaces having a non-arc shape in a main scanning cross-section are provided in at least either the incident optical system or the focusing optical system such that a first direction of aberration is opposite to a second direction of aberration. The first direction is the direction of the phase difference in wavefront aberration in the main scanning direction between the chief ray of the light beam and the marginal rays of the light beam. The phase difference occurs when the light beam incident on the surface to be scanned at the maximum image height passes through the incident optical system. The second direction is the direction of another phase difference in wavefront aberration in the main scanning direction between the chief ray of the light beam and the marginal rays of the light beam. The phase difference occurs when the light beam incident on the surface to be scanned at the maximum image height passes through the focusing optical system.

According to the present invention, the focusing optical system and the incident optical system are constructed such that the aberrations occurring in the two optical systems on the surface to be scanned at an off-axis image height are asymmetrical on both sides of the center of the light beam and the directions of the aberrations are opposite to each other. The present invention can therefore achieve an optical scanner capable of providing excellent spots on the surface to be scanned and forming high-resolution, high-quality images at high speed, and an image forming apparatus using the optical scanner.

Further features of the present invention will become apparent from the following description of exemplary embodiments with reference to the attached drawings.

DESCRIPTION OF THE EMBODIMENTS

Embodiments of the present invention will now be described with reference to the drawings.

First Embodiment

Figure 1:
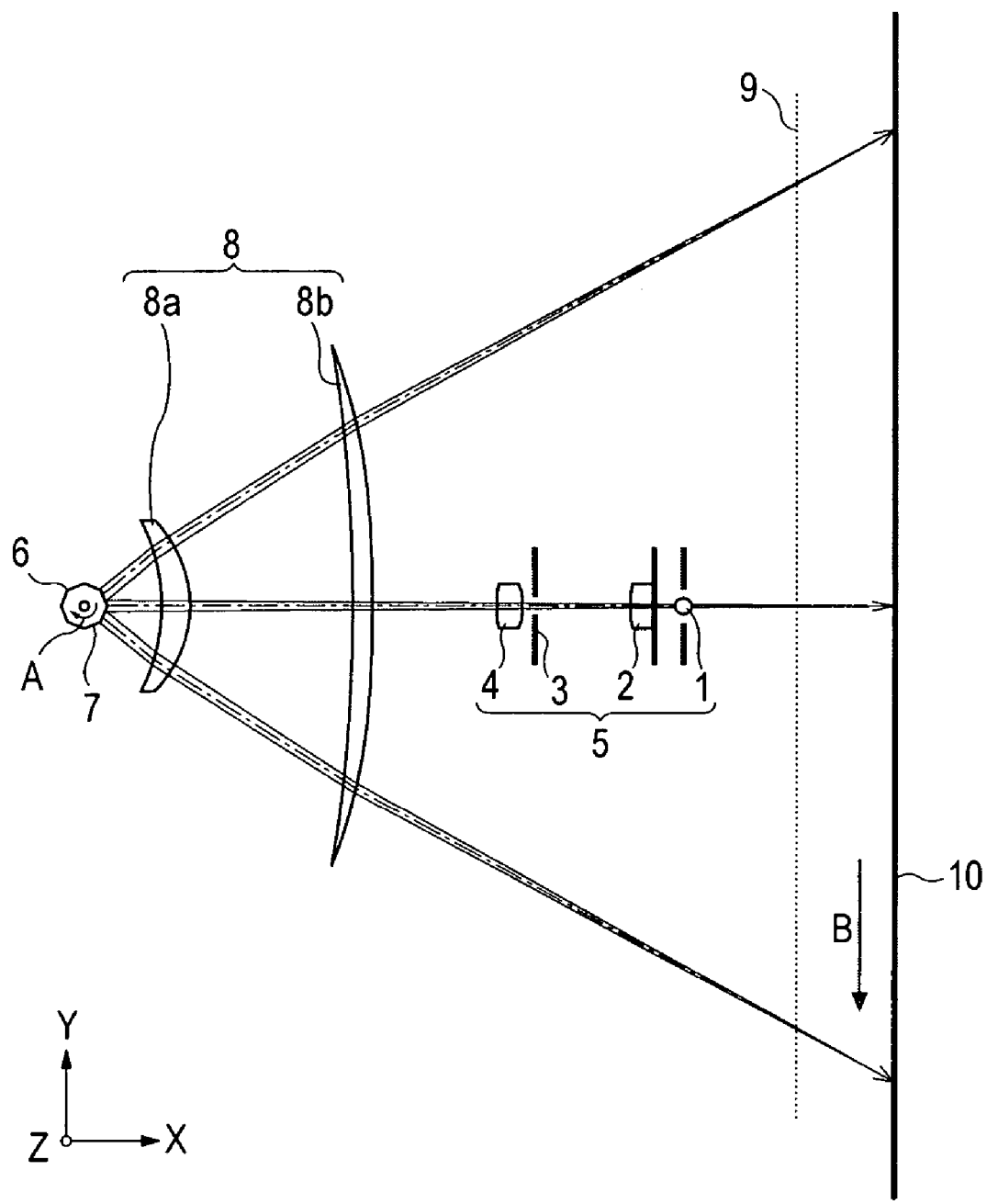
FIG. 1 is a main scanning cross-sectional view of an optical scanner according to a first embodiment of the present invention.
Figure 2:
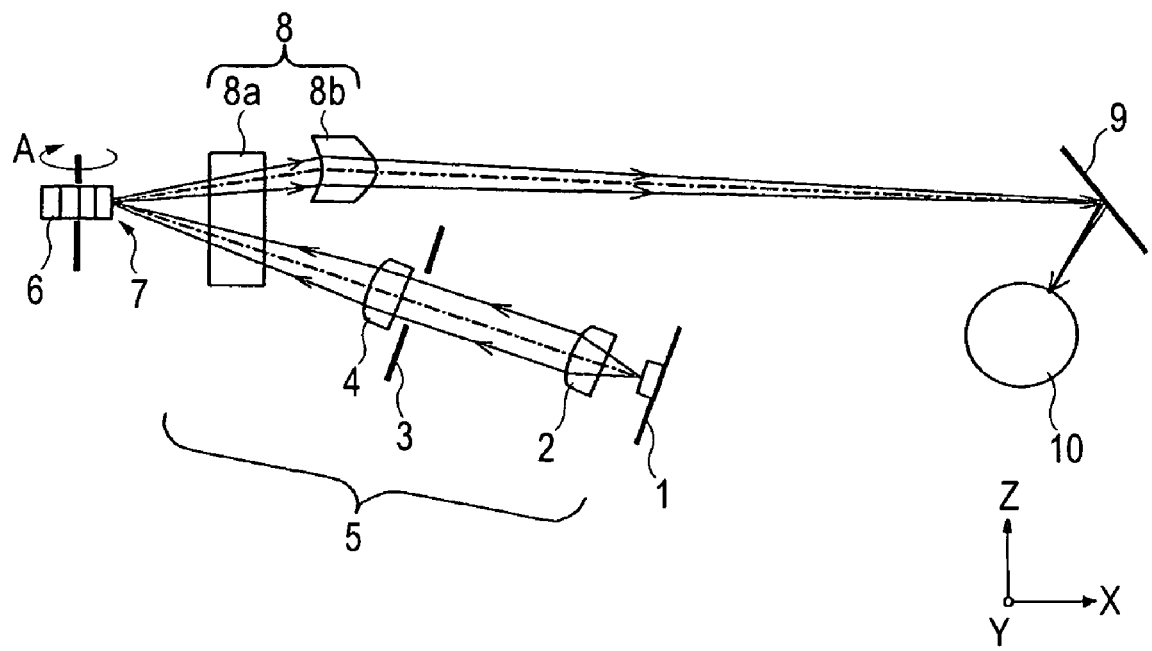
FIG. 2 is a sub-scanning cross-sectional view of the optical scanner according to the first embodiment of the present invention.

FIG. 1 is a sectional view of the main part of an optical scanner according to a first embodiment of the present invention in a main scanning direction (a main scanning cross-sectional view). FIG. 2 is a sectional view of the main part of the optical scanner in FIG. 1 in a sub-scanning direction (a sub-scanning cross-sectional view).

The main scanning direction is the direction perpendicular to the rotation axis of a light deflector and the optical axis of scanning optical elements (in the direction in which the light deflector reflects and deflects a light beam (deflection scanning)). The sub-scanning direction is the direction parallel to the rotation axis of the light deflector. The main scanning cross-section is a plane that is parallel to the main scanning direction and includes the optical axis of a focusing optical system. The sub-scanning cross-section is a plane perpendicular to the main scanning cross-section.

In FIG. 1, a light source 1 is composed of, for example, a monolithic multibeam semiconductor laser having two light-emitting portions (light-emitting points). Although the light source 1 has the two light-emitting portions in this embodiment, the number of light-emitting portions is not limited to two; the light source 1 can also have a single light-emitting portion or three or more light-emitting portions.

A cylindrical lens (sub-scanning cylindrical lens) 2, in the form of an anamorphic optical element, has a predetermined power (refractive power) only in the sub-scanning cross-section to convert two divergent light beams emitted from the light source 1 into light beams substantially collimated in the sub-scanning cross-section.

An aperture (aperture diaphragm) 3 optimally trims the substantially collimated light beams exiting the cylindrical lens 2 into a desired beam shape.

A collimating lens 4, as a light-collecting optical system, has a predetermined power in the main scanning cross-section to convert the two divergent light beams emitted from the light source 1 into light beams collimated in the main-scanning direction. The collimating lens 4 focuses the light beams exiting the cylindrical lens 2, which has a predetermined power only in the sub-scanning direction, onto any deflecting surface 7 of a light deflector 6 described below in the form of a linear image extending in the main scanning direction.

An incident optical system 5 includes the cylindrical lens 2, which has a predetermined power only in the sub-scanning direction, the aperture 3, the collimating lens 4, and an fθ lens 8a described below.

The light deflector 6 is composed of, for example, a rotating polygon mirror, and is rotated at a constant rate in a direction indicated by arrow A in the drawings by a driving unit such as a motor (not shown).

The deflecting surfaces 7 of the light deflector 6 are equivalent to the aperture of the incident optical system 5 in the main scanning direction.

A focusing optical system 8 has fθ characteristics, including a plastic fθ lens (G1 lens) 8a having a predetermined positive power only in the main scanning cross-section and an elongated plastics material toric lens (G2 lens) 8b having a predetermined power only in the sub-scanning cross-section. The focusing optical system 8 focuses the two light beams deflected by the polygon mirror 6, which are based on image information, onto a photosensitive drum surface 10, as a surface to be scanned, in the main scanning cross-section. In the focusing optical system 8, the deflecting surfaces 7 of the polygon mirror 6 are optically conjugated to the photosensitive drum surface 10 in the sub-scanning cross-section to correct surface tilting.

The deflecting surfaces 7 of the light deflector 6 are equivalent to the aperture of the focusing optical system 8 in the main scanning direction.

In this embodiment, the surfaces of the fθ lens 8a and the toric lens 8b on both sides have a non-arc shape in the main scanning cross-section, as shown in Table 2 below.

This embodiment employs a double-pass structure in which the light beams passing through the fθ lens 8a (incident light beams) are deflected by the polygon mirror 6 to enter the fθ lens 8a again (scanning light beams).

A beam-folding mirror 9, as a reflecting member, folds the optical paths of the two light beams passing through the focusing optical system 8 back to the photosensitive drum surface 10. The photosensitive drum surface 10 is a surface to be scanned (recording medium surface).

In this embodiment, the two modulated light beams emitted from the multibeam semiconductor laser 1 enter the sub-scanning cylindrical lens 2, which has power only in the sub-scanning direction. These light beams are collimated in the sub-scanning cross-section to impinge on any deflecting surface 7 of the polygon mirror 6 through the aperture 3, the collimating lens 4, and the fθ lens 8a. The light beams exiting the fθ lens 8a are focused on the deflecting surface 7 in the form of a linear image (elongated in the main scanning direction). The light beams impinge on the deflecting surface 7 of the polygon mirror 6 at a predetermined oblique angle in an oblique direction with respect to the deflecting surface 7 (oblique incident optical system).

The light beams, which are divergent in the main scanning cross-section, are collimated after passing through the aperture 3, the collimating lens 4, and the fθ lens 8a to impinge on the deflecting surface 7 of the polygon mirror 6 in the center of the deflection angle of the polygon mirror 6 (front incidence). The light beams incident on the deflecting surface 7, which are collimated in the main scanning cross-section, are adjusted so as to have a sufficiently large width compared to the facet width (reflection width) of the deflecting surface 7 of the polygon mirror 6 in the main scanning direction (OFS).

The two light beams reflected by the polygon mirror 6 are guided to the photosensitive drum surface 10 through the focusing optical system 8 and the beam-folding mirror 9. As the polygon mirror 6 is rotated in the direction indicated by arrow A in the drawings, the two light beams reflected by the polygon mirror 6 scan the photosensitive drum surface 10 in a direction indicated by arrow B in the drawings (the main scanning direction) to write an image on the photosensitive drum surface 10, as a recording medium.

In this embodiment, the focusing optical system 8 has a lower F-number on the incident side in the sub-scanning direction, namely 3.4, than in the main scanning direction, namely 14. According to such a relationship, in this embodiment, the sub-scanning cylindrical lens 2 is disposed closer to the light source 1 than the collimating lens 4 to reduce the optical path length. The arrangement, however, is not limited to the above arrangement, and the collimating lens 4 can be disposed closer to the light source 1 than the sub-scanning cylindrical lens 2.

In this embodiment, the fθ lens 8a is disposed near the polygon mirror 6 so that the size of the fθ lens 8a can be reduced to achieve lower cost, and, as described above, a double-pass structure is employed, in which both the incident and scanning light beams pass through the fθ lens 8a. In addition, both surfaces of the fθ lens 8a have a non-arc shape in the main scanning cross-section to provide a compact scanner (to reduce the optical path length from the polygon mirror 6 to the surface to be scanned 10). Accordingly, the scanning angle of the polygon mirror 6 is adjusted to a wide range of field angles, namely ±20.25°.

When the lens surfaces of the fθ lens 8a have a non-arc shape in the OFS with the double-pass structure, the incident optical system 5 causes a large aberration which readily leads to coma aberration and field curvature.

In this embodiment, therefore, the incident optical system 5 and the focusing optical system 8 are constructed such that both aberrations (wavefront aberrations) occurring in the two optical systems when the light beams impinge on the surface to be scanned 10 at an off-axis image height are asymmetrical on both sides of the center of the light beams and the directions of the aberrations are opposite to each other. Such a structure significantly inhibits coma aberration and field curvature.

In this embodiment, the incident optical system 5 and the focusing optical system 8 are constructed such that the directions of the aberrations (wavefront aberrations) are opposite to each other at every image height in the overall effective scanning region (the overall image-forming region), although the directions of the aberrations do not necessarily have to be opposite to each other at every image height; they may also be opposite only at certain image heights.

In addition, the directions of the aberrations do not necessarily have to be opposite to each other at every off-axis image height; they may also be opposite only at limited off-axis image heights. The most serious problem for optical scanners is coma aberration and field curvature due to wavefront aberration at the maximum image height.

The correction of coma aberration is described below by taking as an example the wavefront aberration in the main scanning direction at the maximum image height (Y=−107 mm) in this embodiment.

Figure 3A:
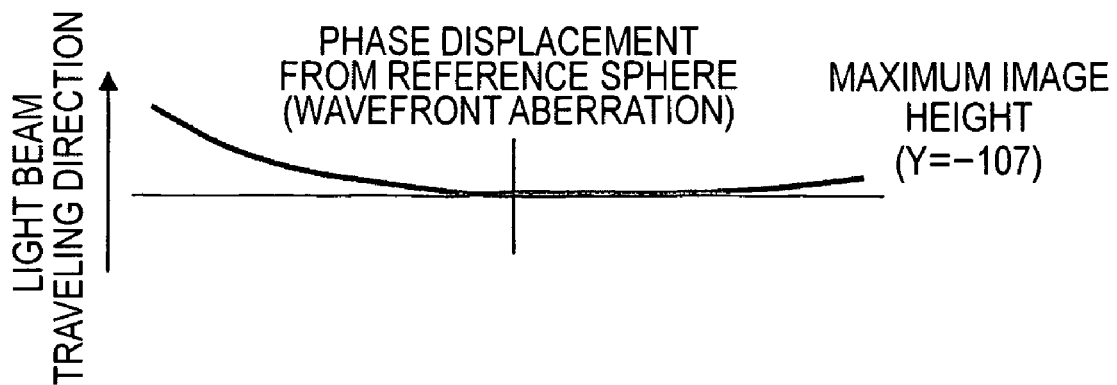
FIGS. 3A, 3B, and 3C are diagrams showing wavefront aberrations (image height Y=−107 mm) caused in a main scanning direction by an incident optical system, a focusing optical system, and the overall system, respectively, in the first embodiment of the present invention.
Figure 3B:
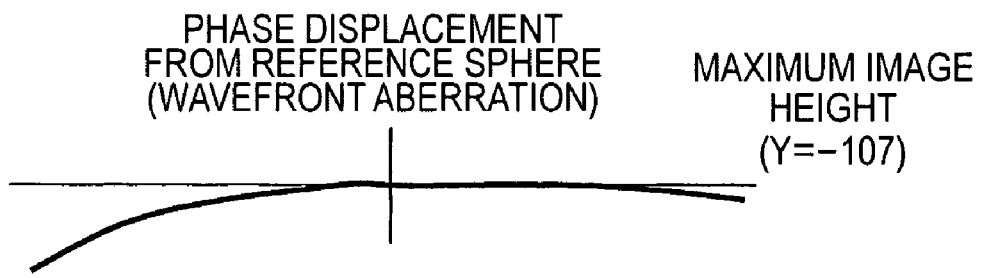
Figure 3C:
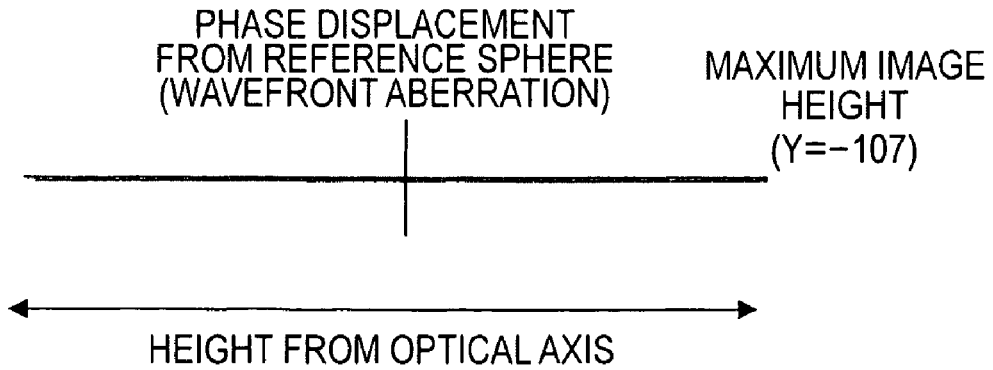

FIGS. 3A, 3B, and 3C are diagrams showing wavefront aberrations caused in the main scanning direction at the maximum image height (Y=−107 mm) by the incident optical system 5, the focusing optical system 8, and the overall system (the combination of the incident optical system 5 and the focusing optical system 8), respectively, in this embodiment.

FIG. 3A shows that the incident optical system 5 causes a wavefront aberration that is asymmetrical in the main scanning direction. The phase of the wavefront aberration on the plus image height side leads that on the minus height image side.

The phase difference is canceled out by causing a wavefront aberration in the focusing optical system 8 in the direction opposite the direction of the wavefront aberration occurring in the incident optical system 5, as shown in FIG. 3B. That is, the focusing optical system 8 is constructed so that the phase of the wavefront aberration on the minus image height side can catch up with that on the plus image height side in the focusing optical system 8. Referring to FIG. 3C, such correction leads to an acceptable wavefront aberration with no coma aberration in the overall system.

Figure 4:
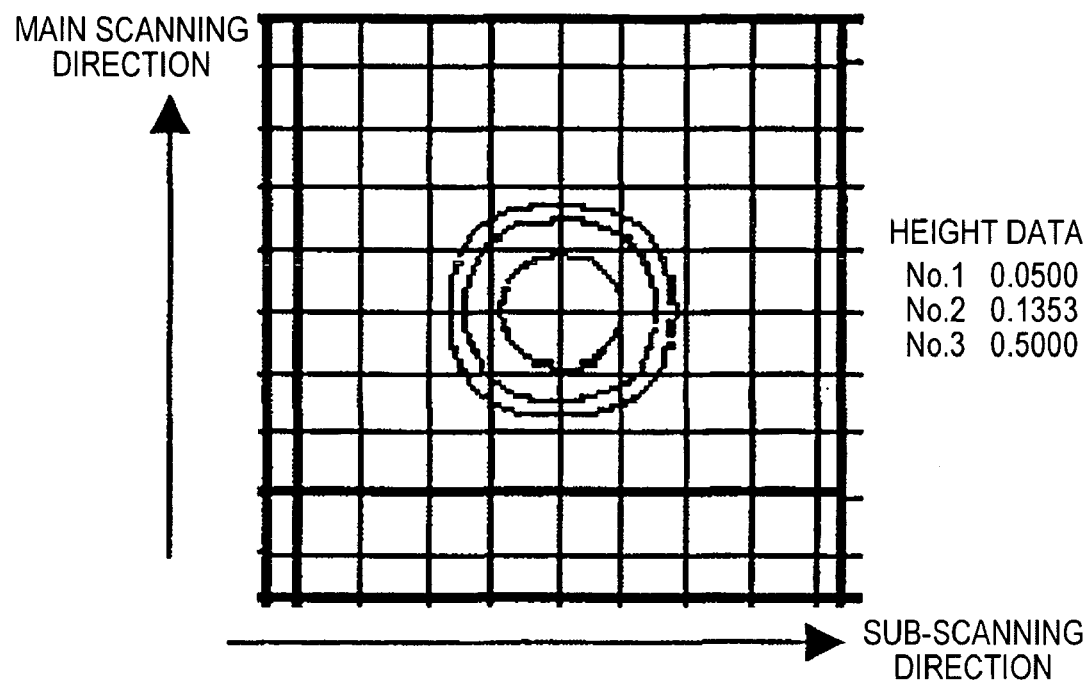
FIG. 4 is a spot diagram at an image height Y=−107 mm in the first embodiment of the present invention.

FIG. 4 is a spot diagram at a maximum image height Y=−107 mm in this embodiment. FIG. 4 shows an excellent spot with no side lobe.

Although the wavefront aberration at the maximum image height (Y=−107 mm) is described as an example, an excellent spot can also be achieved at all other image heights by constructing the incident optical system 5 and the focusing optical system 8 so that an acceptable wavefront aberration results with no coma aberration in the overall system.

In FIGS. 3A and 3B, the wavefront aberration occurring in the focusing optical system 8 at a maximum image height Y=−107 mm is curved in a direction opposite the curve direction of the wavefront aberration occurring in the incident optical system 5. In FIG. 3C, the curvature of the wavefront aberration occurring in the overall system is sufficiently inhibited by canceling out the curvature of the wavefront aberration in the incident optical system 5.

The curvature of the wavefront aberration in the incident optical system 5 is also canceled out at all other image heights, as in the case of a maximum image height Y=−107 mm, and thus the curvature of the wavefront aberration occurring in the overall system is sufficiently inhibited. The overall system can therefore sufficiently reduce the deviation of focal position due to the curvature of the wavefront aberration at all image heights to suppress differences in focal position at different image heights on the surface to be scanned 10 to an acceptable level. That is, this system can suppress field curvature due to the curvature of the wavefront aberration on the surface to be scanned 10 to an acceptable level.

Figure 5:
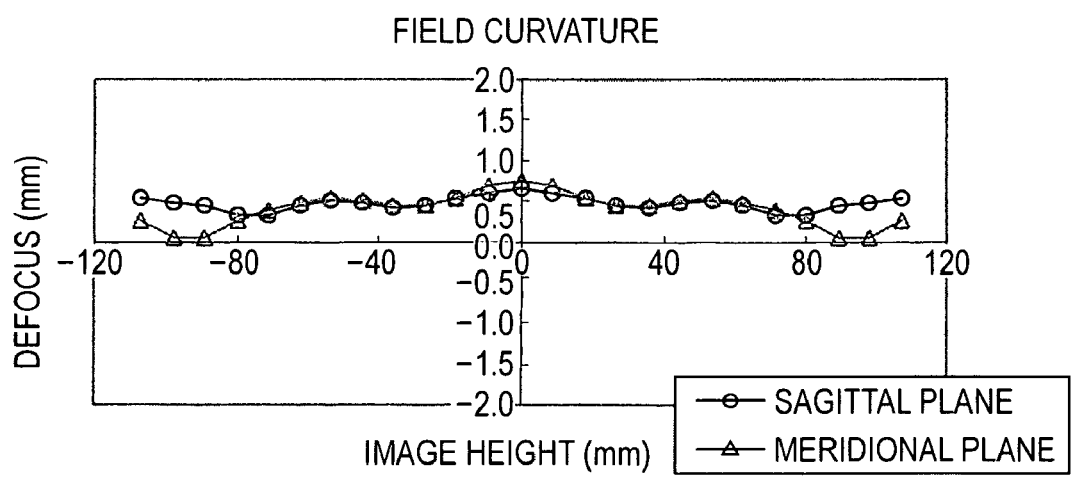
FIG. 5 is a graph showing field curvature in the first embodiment of the present invention.

FIG. 5 is a graph showing field curvature characteristics in the main scanning cross-section and the sub-scanning cross-section in this embodiment. FIG. 5 shows that the field curvature is excellently corrected in the main scanning cross-section and the sub-scanning cross-section. According to this embodiment, therefore, the field curvature is corrected, and thus the expansion of beam spots is suppressed to an acceptable level.

In the focusing optical system 8 in this embodiment, all lens surfaces of the fθ lens 8a and the elongated toric lens 8b have a non-arc shape in the main scanning cross-section to cause the aberration required for suppressing coma aberration and field curvature to such a level that they have no effect on spots. In addition, as described above, the fθ lens 8a and the toric lens 8b are made of a plastics material.

If the aberration occurring in the incident optical system 5 is canceled out in the focusing optical system 8, the width of a light beam incident at the maximum image height on the non-arc-shaped lens surfaces (in the main scanning cross-section) of the fθ lens 8a and the toric lens 8b in the focusing optical system 8 must be larger in the main scanning direction than the width of the light beam on a surface that causes aberration in the incident optical system 5. Otherwise, the lens surfaces of the fθ lens 8a and the toric lens 8b must be formed into a complicated shape in order to correct the asymmetry of the aberration of the light beam in the main scanning direction. As a result, the non-arc-shaped lens surfaces (in the main scanning cross-section) of the fθ lens 8a and the toric lens 8b tend to become more difficult to form.

According to this embodiment, therefore, the width W1 of the light beam passing through the non-arc-shaped lens surfaces (in the main scanning cross-section) of the fθ lens 8a and the toric lens 8b in the main scanning direction at the maximum image height is adjusted to at least 1.8 times the width W2 of the light beam passing through the arc-shaped lens surface (in the main scanning cross-section) in the incident optical system 5, namely W1/W2≧1.8. Accordingly, the aberration can be excellently corrected with no increased difficulty in forming the non-arc lens surfaces (in the main scanning cross-section) of the fθ lens 8a and the toric lens 8b.

Specific values in this embodiment are described below. For a light beam incident at the maximum image height (−107 mm), in this embodiment, which employs an OFS, the width of the light beam on a second surface (light-exiting surface) of the collimating lens 4 in the main scanning direction, namely W2, is 1.47 mm (the width W2 corresponds to the region through which the light beam incident at the maximum image height passes; the region differs for each image height in an OFS). The width of the light beam on a first surface (light-entering surface) of the fθ lens 8a in the main scanning direction, namely W1-1, is 2.80 mm. The width of the light beam on a second surface (light-exiting surface) of the fθ lens 8a in the main scanning direction, namely W1-2, is 2.53 mm. The width of the light beam on a first surface (light-entering surface) of the toric lens 8b in the main scanning direction, namely W1-3, is 2.93 mm. The width of the light beam on a second surface (light-exiting surface) of the toric lens 8b in the main scanning direction, namely W1-4, is 2.75 mm. The width W1 is defined as the highest value among W1-1, W1-2, W1-3, and W1-4, namely 2.93 mm (W1-3). Accordingly, the width W1 of the light beam on the non-arc-shaped surfaces (in the main scanning cross-section) in the focusing optical system 8 is larger than the width W2 of the light beam on the arc-shaped surface in the incident optical system 5, namely W1/W2=1.99, so that the aberration is excellently corrected.

In this embodiment, only the second surface (light-exiting surface) of the collimating lens 4 has an arc shape in the main scanning cross-section in the incident optical system 5. For a plurality of arc-shaped surfaces in the main scanning cross-section in the incident optical system 5, the same effect as above can be achieved by adjusting the ratio of W1/W2 to 1.8 or more, where W2 is defined as the highest value among the widths of the light beam on the individual lens surfaces.

The largest coma aberration in the incident optical system 5 occurs at the maximum image height; therefore, the aberration can be excellently corrected not only at the maximum image height but also at intermediate image heights by adjusting the ratio of W1/W2 to 1.8 or more at the maximum image height.

Figure 15A:
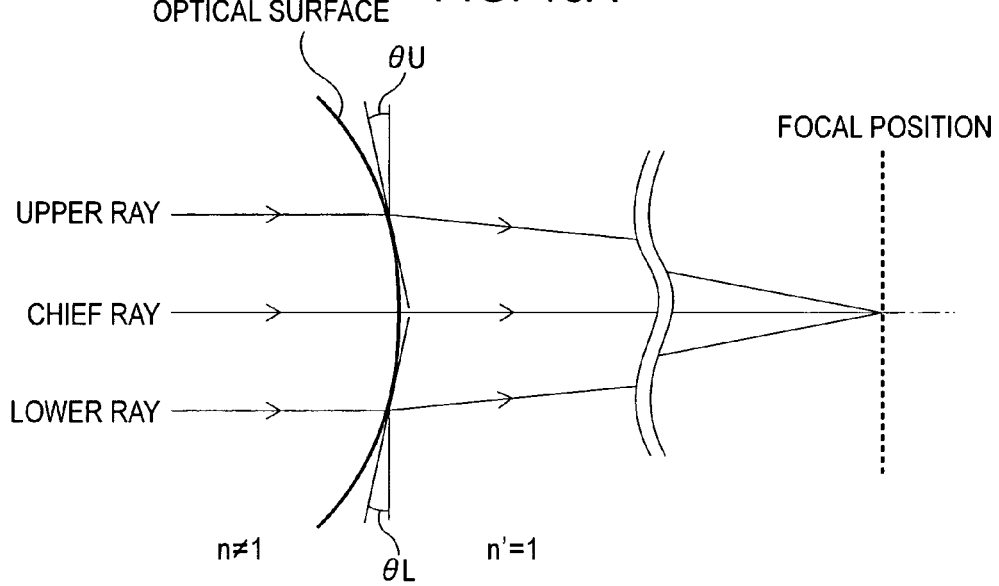
FIGS. 15A and 15B are diagrams illustrating asymmetrical components caused in the phase shape of wavefront aberration by the shapes of symmetrical and asymmetrical optical surfaces, respectively, when a collimated light beam having a wavefront aberration with a symmetrical phase shape on both sides of the chief ray of the light beam passes through the optical surfaces.
Figure 15B:
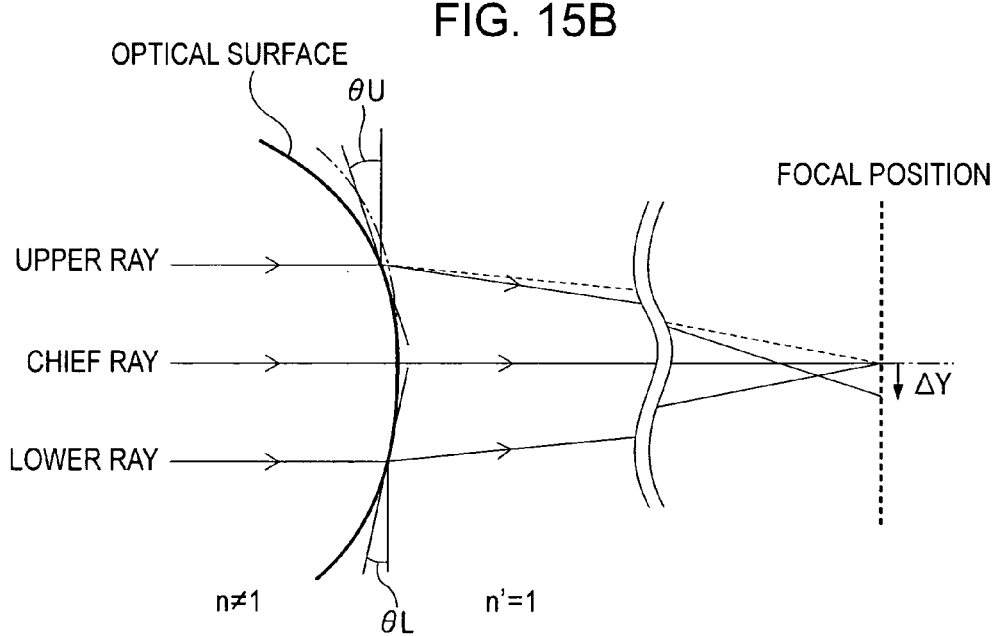

FIGS. 15A and 15B are each diagrams illustrating the asymmetrical component caused in any cross-section by the shape of an optical surface (lens surface), namely the interface between a first medium (refractive index n≠1) and a second medium (refractive index n'=1), in an optical system when a collimated light beam having a wavefront aberration with a symmetrical phase shape on both sides of the chief ray of the light beam passes through the optical surface.

The optical surface in FIG. 15A has a symmetrical shape on both sides of the chief ray of the light beam in any cross-section. In FIG. 15A, θU indicates the gradient of the optical surface at the position through which an upper ray (a marginal ray adjacent to an end of the optical surface) of the light beam passes with respect to the position through which the chief ray passes, and θL indicates the gradient of the optical surface at the position through which a lower ray (a marginal ray adjacent to the optical axis of the optical surface) of the light beam passes with respect to the position through which the chief ray passes. The difference Δθ between the gradients of the optical surface at the positions through which the upper and lower rays of the light beam pass with respect to the optical axis is represented by the following equation (4):

$$\Delta\theta = |\theta U| - |\theta L| \qquad (4)$$

$$\Delta\eta = 0$$

The upper and lower rays of the light beam are subjected to refractive powers that are symmetrical on both sides of the optical axis. Accordingly, the light beam exiting the optical surface is a collimated light beam having a wavefront aberration that remains symmetrical on both sides of the chief ray of the light beam, and the intersection point of the upper ray and the chief ray substantially agrees with that of the lower ray and the chief ray.

The optical surface in FIG. 15B has an asymmetrical shape on both sides of the chief ray of the light beam in any cross-section. In FIG. 15B, θU indicates the gradient of the optical surface at the position through which the upper ray (a marginal ray adjacent to an end of the optical surface) of the light beam passes with respect to the position through which the chief ray passes, and θL indicates the gradient of the optical surface at the position through which the lower ray (a marginal ray adjacent to the optical axis of the optical surface) of the light beam passes with respect to the position through which the chief ray passes. The difference Δθ between the gradients of the optical surface at the positions through which the upper and lower rays of the light beam pass with respect to the optical axis is represented by the following equation:

$$\Delta\theta = |\theta U| - |\theta L|$$

$$\Delta\theta \neq 0$$

As Δθ increases, the refractive power acting on the upper ray of the light beam increases relative to that acting on the lower ray of the light beam. Thus the optical surface (lens surface) exerts a refractive power that is asymmetrical on both sides of the optical axis on the collimated light beam. Accordingly, the light beam exiting the optical surface is a convergent light beam having a wavefront aberration with an asymmetrical phase shape on both sides of the chief ray of the light beam, and the intersection point of the upper ray and the chief ray deviates from that of the lower ray and the chief ray. That is, a larger difference Δθ between the gradients of the lens surface at the positions through which the upper and lower rays pass with respect to the position through which the chief ray passes results in a larger asymmetrical component (with the chief ray as the central axis) caused in the phase shape of the wavefront aberration when the light beam passes through the optical surface.

An asymmetrical component H caused by the shape of an optical surface, namely the interface between a first medium (refractive index n≠1) and a second medium (refractive index n'=1), when a collimated light beam having a wavefront aberration with a symmetrical phase shape on both sides of the chief ray of the light beam passes through the optical surface is represented by the following equation (5):

$$H = (n-1) \times \Delta\theta \quad (5)$$

For an optical system including a plurality of optical surfaces, the asymmetrical component caused in the phase shape of the wavefront aberration by the overall optical system with the chief ray as the central axis is the sum of the asymmetrical components caused in the phase shape of the wavefront aberration by the individual optical surfaces with the chief ray as the central axis. The asymmetrical component H' caused in the phase shape of the wavefront aberration by the overall optical system with the chief ray as the central axis is represented by the following equation (6):

$$H' = \sum_i [Ui \times (ni - 1) \times \Delta\theta] \quad (6)$$

where Ui is a coefficient that is −1 for a light-entering transparent optical surface and that is +1 for a light-exiting transparent optical surface or a reflective optical surface; and ni is a coefficient that equals the refractive index of glass for a transparent optical surface and that is 2 for a reflective optical surface.

Next, the equation (6) is applied to the case of a light beam incident at any image height in the main-scanning cross-section in an optical system (a focusing optical system or an incident optical system) in an optical scanner. The gradient dX/dY of the i-th optical surface at the position through which a marginal ray, adjacent to an end of the optical surface, of a light beam incident at the maximum image height passes with respect to the optical axis of the optical surface in the main-scanning cross-section is indicated by ai. The gradient dX/dY of the i-th optical surface at the position through which the chief ray of the light beam incident at the maximum image height passes with respect to the optical axis of the optical surface in the main-scanning cross-section is indicated by bi. The gradient dX/dY of the i-th optical surface at the position through which a marginal ray, adjacent to the optical axis of the optical surface, of the light beam incident at the maximum image height passes with respect to the optical axis of the optical surface in the main-scanning cross-section is indicated by ci. Using ai, bi, and ci, |θU| and |θL| are represented by the following equations:

$$|\theta U| = |ai - bi|$$

$$|\theta L| = |bi - ci|$$

Substituting these equations into the equation (4) yields the following equation (7):

$$\Delta\theta = |\theta U| - |\theta L| = |ai - bi| - |bi - ci| \quad (7)$$

Substituting the equation (7) into the equation (6) yields the following equation (8):

$$H' = \sum_i [Ui \times (ni - 1) \times \{|ai - bi| - |bi - ci|\}] \quad (8)$$

The equation (8) represents the correlation between the surface shapes and the asymmetrical component H' caused in the phase shape of the wavefront aberration by the optical system (a focusing optical system or an incident optical system) in the optical scanner when the light beam incident at any image height passes through the overall optical system in the optical scanner with the chief ray of the light beam as the central axis in the main-scanning cross-section. If an optical system in an optical scanner used in an image forming apparatus produces a large asymmetrical component H', a light beam is focused on a surface to be scanned in a spot with an asymmetrical shape, and thus the optical scanner disadvantageously cannot provide an excellent image.

In this embodiment, the individual values are adjusted so that the following equations can be satisfied to reduce the asymmetrical component H' of the phase shape of the wavefront aberration and thus achieve focused spots with an excellent shape.

When the incident optical system 5 has m optical surfaces (m≧1), the focusing optical system 8 has p optical surfaces (P≧1), the optical surfaces in the incident optical system 5 are the first to m-th surfaces from the light source side, and the optical surfaces in the focusing optical system 8 are the (m+1)-th to (p+m+1)-th surfaces from the light deflector side, the following equations are satisfied:

$$B/A < 0 \tag{9}$$

$$f \times |A + B| \leq 2 \times \rho m \tag{10}$$

$$A = \sum_{i=1}^{m} [Ui \times (ni - 1) \times \{|ai - bi| - |bi - ci|\}] \tag{11}$$

$$B = \sum_{i=m+1}^{p+m+1} [Ui \times (ni - 1) \times \{|ai - bi| - |bi - ci|\}] \tag{12}$$

where A is the sum of the asymmetrical components caused in the phase shape of the wavefront aberration in the main-scanning cross-section when a light beam, incident at the maximum image height, having a wavefront aberration that is symmetrical on both sides of the chief ray of the light beam passes through the individual optical surfaces in the incident optical system 5; B is the sum of the asymmetrical components caused in the phase shape of the wavefront aberration in the main-scanning cross-section when the light beam, incident at the maximum image height, having a wavefront aberration that is symmetrical on both sides of the chief ray of the light beam passes through the individual optical surfaces in the focusing optical system 8; Ui is a coefficient that is −1 for a light-entering transparent optical surface and that is +1 for a light-exiting transparent optical surface or a reflective optical surface; ni is a coefficient that equals the refractive index of glass for a transparent optical surface and that is 2 for a reflective optical surface; ai is the gradient dX/dY of the i-th optical surface at the position through which a marginal ray, adjacent to an end of the optical surface, of the light beam incident at the maximum image height passes with respect to the optical axis of the optical surface in the main-scanning cross-section; bi is the gradient dX/dY of the i-th optical surface at the position through which the chief ray of the light beam incident at the maximum image height passes with respect to the optical axis of the optical surface in the main-scanning cross-section; ci is the gradient dX/dY of the i-th optical surface at the position through which a marginal ray, adjacent to the optical axis of the focusing optical system 8 or the incident optical system 5, of the light beam incident at the maximum image height passes with respect to the optical axis of the optical surface in the main-scanning cross-section; f is the focal length (mm) of the focusing optical system 8; and ρm is the diameter (mm) of a focused spot on the surface to be scanned 10 in the main scanning direction.

The equations (9) to (12) are described below.

A is the sum of the asymmetrical components caused in the phase shape of the wavefront aberration when the light beam incident at the maximum image height passes through the incident optical system 5 with the chief ray of the light beam as the central axis in the main-scanning cross-section. B is the sum of the asymmetrical components caused in the phase shape of the wavefront aberration when the light beam incident at the maximum image height passes through the focusing optical system 8 with the chief ray of the light beam as the central axis in the main-scanning cross-section. In this embodiment, the shapes of the lens surfaces are adjusted so that the directions of the asymmetrical components caused in the phase shapes of the wavefront aberrations by the incident optical system 5 and the focusing optical system 8 with the chief ray of the light beam as the central axis are opposite to each other, as shown in the equation (9). This reduces the asymmetrical component H' (=A+B) caused in the phase shape of the wavefront aberration by the overall optical system in the optical scanner with the chief ray of the light beam as the central axis.

The left side of the equation (10) is an approximation of the amount of deviation ΔY in the main-scanning cross-section between the intersection point of the chief ray and lower ray of the light beam incident on the surface to be scanned 10 at the maximum image height and the intersection point of the chief ray and upper ray of the light beam. This approximation is based on the focal length of the focusing optical system 8 and the asymmetrical component caused in the phase shape of the wavefront aberration by the overall optical system in the optical scanner with the chief ray of the light beam as the central axis. The equation (10) means that the amount of deviation ΔY is not larger than twice the diameter of a focused spot in the main scanning direction. If the equation (10) is satisfied, the asymmetry of the shape of a focused spot on the surface to be scanned 10 can be sufficiently reduced to provide an excellent image.

Because higher-quality images have recently been demanded, the following equation (10') should be satisfied:

$$f \times |A+B| \leq \rho m \tag{10'}$$

When the equation (10') is satisfied, the amount of deviation ΔY in the main-scanning cross-section between the intersection point of the chief ray and lower ray of the light beam incident on the surface to be scanned 10 at the maximum image height and the intersection point of the chief ray and upper ray of the light beam is not larger than the diameter of a focused spot on the surface to be scanned 10 in the main scanning direction. As a result, spots with an excellent shape can be achieved to provide a higher-quality image.

The largest coma aberration in the main-scanning cross-section in the incident optical system 5 and the focusing optical system 8 tends to occur at the maximum image height. If, therefore, the above equations (9) to (12) are satisfied at the maximum image height, the coma aberration can be sufficiently reduced at all image heights to provide spots with an excellent shape.

Table 4 shows the individual values in the above equations (9) to (12) for the individual surfaces through which a light beam incident at a maximum image height Y=−107 mm passes in this embodiment. In this embodiment, ai, bi, and ci are first order differentials dX/dY according to equation (1) set out below, which indicates the shape of a generating line. In Table 4, A is a negative value, namely −1.8E-4, B is a positive value, namely 2.4E-4, and thus equation (9) is satisfied, namely B/A=−1.38<0. In addition, the shapes of the lens surfaces are adjusted so that the equation (10') is satisfied. That is, because ρm=0.06 mm and f=151 mm, f|A+B|=0.010<ρm=0.060 (mm)

In this embodiment, as described above, the focusing optical system 8 is constructed so that coma aberration and field curvature due to the aberration occurring in the incident optical system 5 can be canceled out. The incident optical system 5 therefore does not require an aspherical lens or a plurality of lenses for correcting spherical aberration. Thus, the incident optical system 5 can be composed of only the two lenses, namely the collimating lens 4 (having a flat light-entering surface and a convex spherical light-exiting surface) and the cylindrical lens 2 (having a flat light-entering surface and a convex light-exiting surface with power in the sub-scanning direction). The incident optical system 5 is therefore advantageous in terms of ease of manufacture. In addition, the optical scanner is advantageous in terms of increasing speed because the F-number on the incident side in the main scanning direction can be reduced to enhance luminous efficiency (in this embodiment, as described above, the F-number on the incident side in the main scanning direction is 14, and the F-number on the incident side in the sub-scanning direction is 3.4)

Although a double-pass structure is employed in this embodiment, sufficient effect can also be achieved for a single-pass structure because the F-number on the incident side in the main scanning direction is small and a large spherical aberration occurs.

Table 1 shows the properties of the focusing optical system 8 in this embodiment. Table 2 shows data (R, D, and N) of the focusing optical system 8 in this embodiment. Table 3 shows aspherical shapes in this embodiment.

TABLE 1

| | | | |
|---|---|---|---|
| Laser power | E | 5 | (mW) |
| Number of light-emitting points | N | 2 | |
| Interval between light-emitting points | $d_1$ | 90 | (μm) |
| Wavelength used | λ | 790 | (nm) |
| Incident F-number in main scanning direction | Fm | 14 | — |
| Incident F-number in sub-scanning direction | Fs | 3.4 | — |
| Width of deflecting surface 7 in main scanning direction | W | 2.85 | (mm) |
| Effective light beam width in main scanning direction | Wo | 5.06 | (mm) |
| Diameter of circle circumscribing polygon mirror 6 | $\phi_1$ | 7.45 | (mm) |
| Diameter of circle inscribed in polygon mirror 6 | $\phi_2$ | 6.88 | (mm) |
| Oblique incident angle in sub-scanning cross-section | θ | 3 | (deg) |
| Number of deflecting surfaces 7 | M | 8 | (surfaces) |
| Scanning efficiency | Du | 90 | (%) |
| Maximum scanning angle | ±α | 40.5 | (deg) |
| Magnification of focusing optical system 8 in sub-scanning direction | βs | 2 | (times) |
| Effective scanning width | 2Yo | 214 | (mm) |
| Diameter of focused spot in main scanning direction | ρm | 60 | (μm) |
| Diameter of focused spot in sub-scanning direction | ρs | 70 | (μm) |

TABLE 2

| | Surface | R | D | N |
|---|---|---|---|---|
| Light-emitting points of semiconductor laser 1 | 1st surface | | 6.59 | 1 |
| Cylindrical lens 2 | 2nd surface | ∞ | 5 | 1.762 |
| | 3rd surface | Table 3 | 24.64 | 1 |
| Collimating lens 4 | 4th surface | ∞ | 5 | 1.524 |
| | 5th surface | −45.05 | 66.97 | 1 |
| G1 lens 8a | 6th surface | Table 3 | 6 | 1.524 |
| | 7th surface | Table 3 | 14.88 | 1 |
| Deflecting surfaces 7 of polygon mirror 6 | 8th surface | ∞ | 14.88 | 1 |
| G1 lens 8a | 9th surface | Table 3 | 6 | 1.524 |
| | 10th surface | Table 3 | 43.33 | 1 |
| G2 lens 8b | 11th surface | Table 3 | 4 | 1.524 |
| | 12th surface | Table 3 | 114.45 | 1 |
| Surface to be scanned 10 | 13th surface | ∞ | | |

TABLE 3

| | | Incident optical system | | |
|---|---|---|---|---|
| | | Cylindrical lens 2 | G1 lens 8a | |
| | | 3rd surface | 6th surface | 7th surface |
| Shape of generating line | R | ∞ | 2.30E+01 | 3.22E+01 |
| | K | 0 | −1.07E+00 | 5.94E−01 |
| | B4 | 0 | −4.65E−06 | −2.00E−05 |
| | B6 | 0 | −1.68E−08 | −7.74E−09 |
| | B8 | 0 | 4.82E−11 | 1.05E−10 |
| | B10 | 0 | −1.79E−14 | −1.74E−13 |
| Shape of line perpendicular to generating line | r | −7.18E+00 | 5.00E+02 | 5.00E+02 |
| | D2 | 0 | 0 | 0 |
| | D4 | 0 | 0 | 0 |
| | D6 | 0 | 0 | 0 |
| | D8 | 0 | 0 | 0 |
| | D10 | 0 | 0 | 0 |

| | | Focusing optical system | | | |
|---|---|---|---|---|---|
| | | G1 lens 8a | | G2 lens 8b | |
| | | 9th surface | 10th surface | 11th surface | 12th surface |
| Shape of generating line | R | −3.22E+01 | −2.30E+01 | −3.53E+02 | 1.96E+03 |
| | K | 5.94E−01 | −1.07E+00 | −9.47E+01 | −1.41E+04 |
| | B4 | 2.00E−05 | 4.65E−06 | 3.80E−07 | −1.35E−06 |
| | B6 | 7.74E−09 | 1.68E−08 | −4.35E−10 | 3.51E−10 |
| | B8 | −1.05E−10 | −4.82E−11 | 1.19E−13 | −1.41E−13 |
| | B10 | 1.74E−13 | 1.79E−14 | −6.73E−18 | 2.84E−17 |
| Shape of line perpendicular to generating line | r | −5.00E+02 | −5.00E+02 | −3.15E+02 | −1.90E+01 |
| | D2 | 0 | 0 | −8.48E−04 | 1.81E−04 |
| | D4 | 0 | 0 | 1.28E−06 | −6.80E−08 |
| | D6 | 0 | 0 | 1.18E−10 | 4.28E−11 |
| | D8 | 0 | 0 | −9.85E−13 | 2.57E−15 |
| | D10 | 0 | 0 | 6.89E−16 | −5.80E−18 |

TABLE 4

| | Incident optical system | | | | | |
| --- | --- | --- | --- | --- | --- | --- |
| | Cylindrical lens 2 | | Collimating lens 4 | | G1 lens 8a | |
| Surface number | 2 | 3 | 4 | 5 | 7 | 8 |
| Ui | −1 | 1 | −1 | 1 | −1 | 1 |
| ni | 1.762 | 1.762 | 1.524 | 1.524 | 1.524 | 1.524 |
| Position through which upper ray passes (with respect to optical axis in generating line direction) | −0.24 | −0.34 | −1.22 | −1.34 | −2.70 | −2.54 |
| ai | 0 | 0 | 0 | 3.0E−02 | −1.2E−01 | −7.8E−02 |
| Position through which chief ray passes (with respect to optical axis in generating line direction) | −0.11 | −0.16 | −0.58 | −0.60 | −1.28 | −1.20 |
| bi | 0 | 0 | 0 | 1.3E−02 | −5.6E−02 | −3.7E−02 |
| Position through which lower ray passes (with respect to optical axis in generating line direction) | 0.01 | 0.02 | 0.06 | 0.13 | 0.14 | 0.13 |
| ci | 0 | 0 | 0 | −2.9E−03 | 6.2E−03 | 4.2E−03 |
| Ui(ni − 1) x{|ai − bi| − |bi − ci|} | 0.0E+00 | 0.0E+00 | 0.0E+00 | 5.6E−06 | 1.4E−04 | −3.2E−04 |
| | | | A = −1.8E−04 | | | |

| | Focusing optical system | | | |
| --- | --- | --- | --- | --- |
| | G1 lens 8a | | G2 lens 8b | |
| Surface number | 9 | 10 | 11 | 12 |
| Ui | −1 | 1 | −1 | 1 |
| ni | 1.524 | 1.524 | 1.524 | 1.524 |
| Position through which upper ray passes (with respect to optical axis in generating line direction) | −13.83 | −16.02 | −41.79 | −43.05 |
| ai | 3.2E−01 | 6.0E−01 | 1.1E−01 | 2.8E−01 |
| Position through which chief ray passes (with respect to optical axis in generating line direction) | −12.44 | −14.77 | −40.34 | −41.69 |
| bi | 3.0E−01 | 5.6E−01 | 1.1E−01 | 2.6E−01 |
| Position through which lower ray passes (with respect to optical axis in generating line direction) | −11.03 | −13.49 | −38.87 | −40.30 |
| ci | 2.8E−01 | 5.2E−01 | 1.0E−01 | 2.4E−01 |
| Ui(ni − 1) x{|ai − bi| − |bi − ci|} | −1.9E−04 | 3.6E−04 | 5.1E−04 | −4.3E−04 |
| | | B = 2.4E−04 | | |

The aspherical surfaces are defined by the following equations.

The intersection point of a curved surface of a lens and the optical axis thereof is defined as an origin point. The optical axis direction is defined as the x-axis. The axis orthogonal to the optical axis in the main scanning cross-section is defined as the y-axis. The axis orthogonal to the optical axis in the sub-scanning cross-section is defined as the z-axis. A generating line is defined as the cutting line of the xy-plane and the curved surface, and a line perpendicular to the generating line is defined as the cutting line of the xz-plane and the curved surface.

The shape of a generating line is represented by the equation (1):

[Equation 1]

$$X = \frac{Y^2/R}{1 + \sqrt{1 - (1+K) \times (Y/R)^2}} + B_4 Y^4 + B_6 Y^6 + B_8 Y^8 + B_{10} Y^{10} \quad (1)$$

where R is the radius of curvature; and K, $B_4$, $B_6$, $B_8$, and $B_{10}$ are the aspherical surface coefficients of the generating line.

The shape of a line perpendicular to the generating line is represented by the equation (2):

[Equation 2]

$$S = \frac{Z^2/r'}{1 + \sqrt{1 - (Z/r')^2}} \quad (2)$$

The radius of curvature r' of the line perpendicular to the generating line, which varies with the value of Y, is represented by the equation (3):

[Equation 3]

$$r' = r_0 \times (1 + D_2 Y^2 + D_4 Y^4 + D_6 Y^6 + D_8 Y^8 + D_{10} Y^{10}) \quad (3)$$

where $r_0$ is the radius of curvature of the line perpendicular to the generating line on the optical axis; and $D_2$, $D_4$, $D_6$, $D_8$, and $D_{10}$ are coefficients.

Second Embodiment

Figure 6:
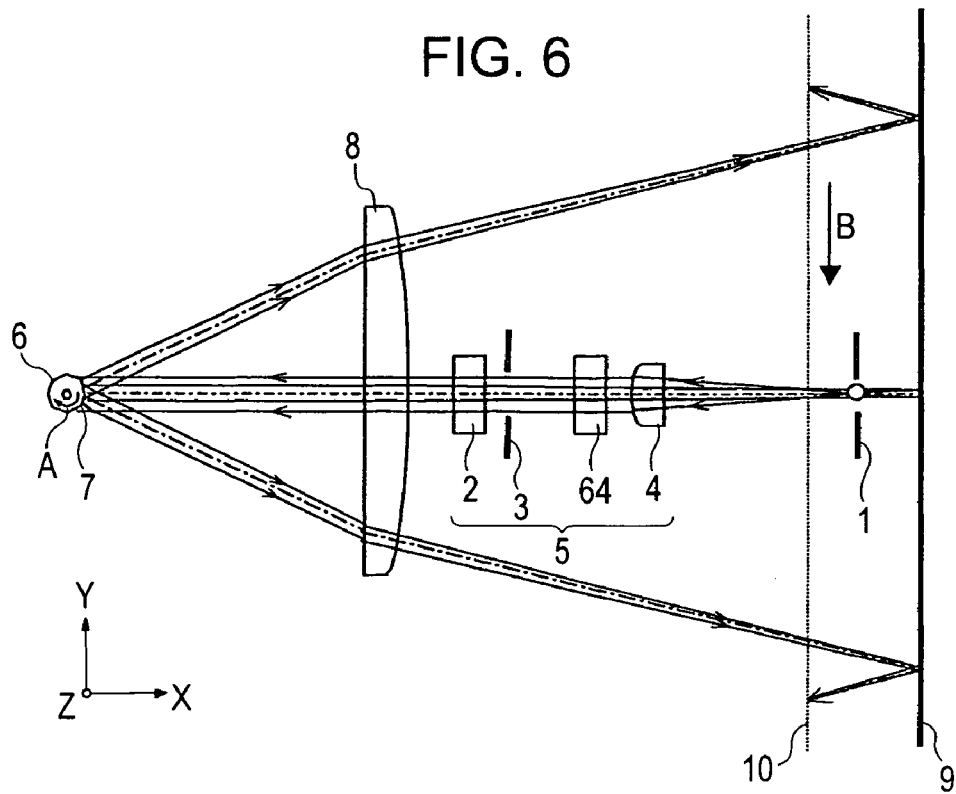
FIG. 6 is a main scanning cross-sectional view of an optical scanner according to a second embodiment of the present invention.
Figure 7:
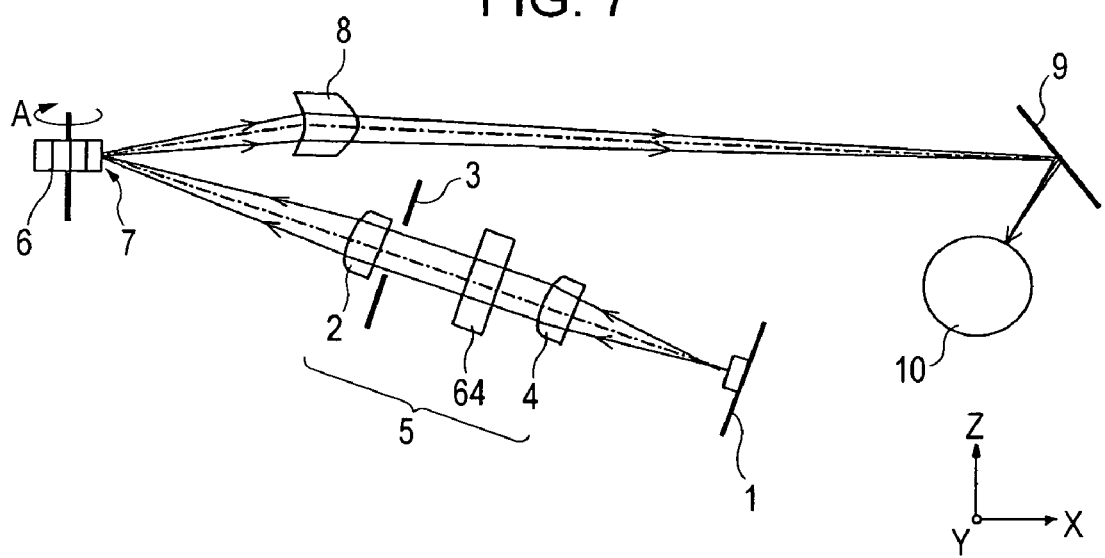
FIG. 7 is a sub-scanning cross-sectional view of the optical scanner according to the second embodiment of the present invention.

FIG. 6 is a sectional view of the main part of an optical scanner according to a second embodiment of the present invention in a main scanning direction (a main scanning cross-sectional view). FIG. 2 is a sectional view of the main part of the optical scanner in FIG. 6 in a sub-scanning direction (a sub-scanning cross-sectional view). In FIGS. 6 and 7, the same reference numerals as in FIGS. 1 and 2 indicate the same components.

The second embodiment is different from the first embodiment in that the collimating lens 4 is disposed closer to the light source 1 than the sub-scanning cylindrical lens 2 in the incident optical system 5, that the incident optical system 5 further includes a correcting lens 64, and that the focusing optical system 8 is composed of a single toric lens 8. In the main scanning cross-section, the light-entering surface of the toric lens 8 is flat, and the light-exiting surface thereof has a non-arc shape with positive power. In the sub-scanning cross-section, the light-entering surface of the toric lens 8 has an arc shape with negative power, and the light-exiting surface thereof has an arc shape with positive power. Another difference is the use of a single-pass structure in which only the light beam reflected by any deflecting surface 7 of the polygon mirror 6 passes through the toric lens 8, that is, in which the light beam incident on the deflecting surface 7 of the polygon mirror 6 does not pass through the toric lens 8. The other structures and optical operations are substantially the same as those in the first embodiment, and thus the same effect can be achieved. With the single toric lens 8, this optical scanner can correct field curvature in the main scanning direction, provide excellent fθ characteristics, and correct field curvature in the sub-scanning direction and surface tilting (the deflecting surfaces 7 are conjugated to the photosensitive drum surface 10).

The light-exiting surface of the correcting lens 64 in FIG. 6 has a non-arc shape in the main scanning cross-section and is flat in the sub-scanning cross-section so that a wavefront aberration occurs in a direction opposite the direction of coma aberration occurring in the focusing optical system 8 at all image heights.

In this embodiment, the focusing optical system 8 has difficulty in completely inhibiting the coma aberration occurring in the focusing optical system 8 itself at all image heights because the focusing optical system 8 is composed of a single toric lens.

In this embodiment, therefore, the correcting lens 64 is provided in the incident optical system 5 so that a wavefront aberration occurs in the incident optical system 5 in a direction opposite the direction of the wavefront aberration occurring in the focusing optical system 8 to suppress coma aberration and field curvature.

Figure 8A:
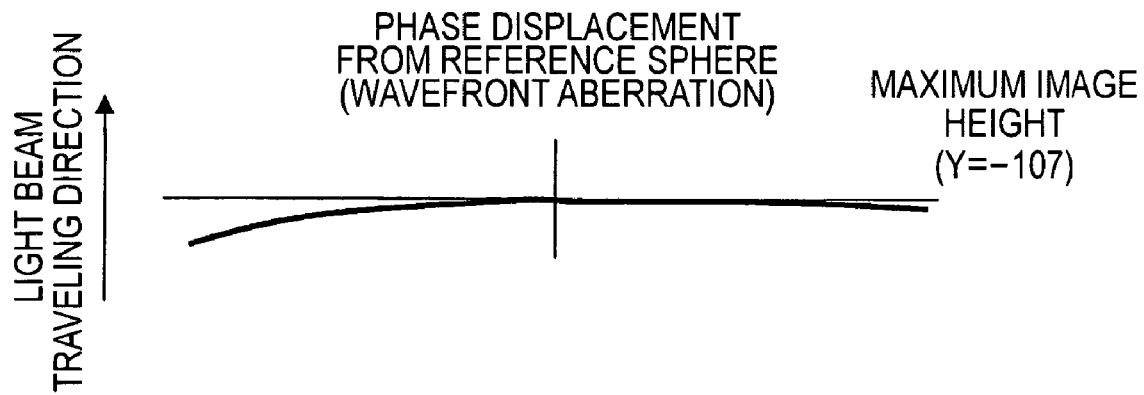
FIGS. 8A, 8B, and 8C are diagrams showing wavefront aberrations (image height Y=−107 mm) caused in the main scanning direction by an incident optical system, a focusing optical system, and the overall system, respectively, in the second embodiment of the present invention.
Figure 8B:
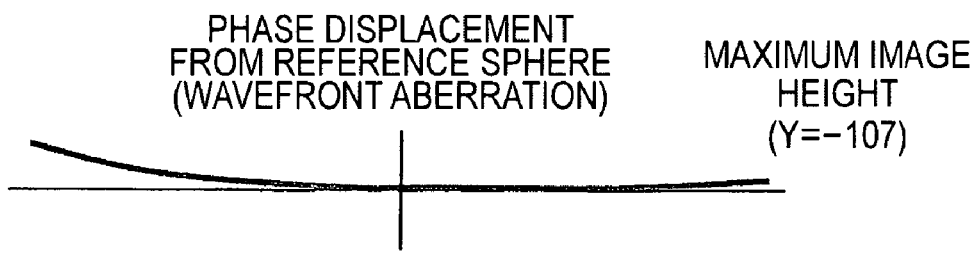
Figure 8C:
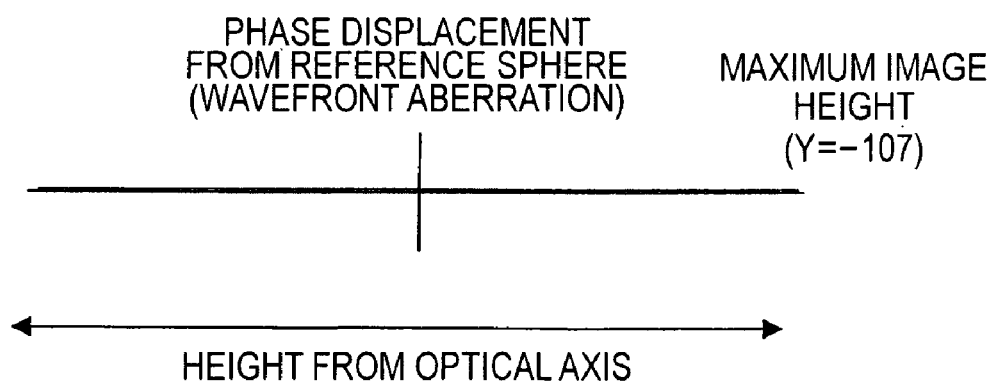

FIGS. 8A, 8B, and 8C show wavefront aberrations caused in the main scanning direction at an image height Y=−107 mm by the incident optical system 5, the focusing optical system 8, and the overall system, respectively, in this embodiment.

In FIGS. 8A and 8B, a wavefront aberration occurs in the incident optical system 5 in a direction opposite the direction of the wavefront aberration occurring in the focusing optical system 8. In FIG. 3C, these wavefront aberrations cancel each other out so that the wavefront aberration in the overall system is excellently corrected.

That is, in this embodiment, the correcting lens 64, which has an aspherical surface, is provided in the incident optical system 5 so that an aberration occurs in the incident optical system 5 to cancel out the coma aberration occurring in the focusing optical system 8 at all image heights, thus providing excellent spots.

In FIGS. 8A and 8B, additionally, the correcting lens 64 is formed so that the wavefront aberration occurring in the incident optical system 5 at a maximum image height Y=−107 mm is curved in a direction opposite the curve direction of the wavefront aberration occurring in the focusing optical system 8. In FIG. 3C, the curvature of the wavefront aberration in the focusing optical system 8 is canceled out by the wavefront aberration in the opposite direction, and thus the curvature of the wavefront aberration in the overall system is sufficiently inhibited.

The curvature of the wavefront aberration in the focusing optical system 8 is also canceled out at all other image heights, as in the case of a maximum image height Y=−107 mm, and thus the curvature of the wavefront aberration in the overall system is sufficiently inhibited. The overall system can therefore sufficiently reduce the deviation of focal position due to the curvature of the wavefront aberration at all image heights to suppress field curvature due to the curvature of the wavefront aberration on the surface to be scanned 10 to an acceptable level.

If the coma aberration occurring in the focusing optical system 8 is canceled out in the incident optical system 5, the region B (the width in the main scanning direction) through which a light beam incident at the maximum image height (Y=−107 mm) passes on the non-arc-shaped lens surface (in the main scanning cross-section) of the correcting lens 64 in the incident optical system 5 must be wider in the main scanning cross-section than a region A (the width in the main scanning direction) through which the light beam incident at the maximum image height (Y=−107 mm) passes on a lens surface that causes coma aberration in the focusing optical system 8. If the region B (the width in the main scanning direction) is not wider, the non-arc-shaped lens surface (in the main scanning cross-section) must be formed into a complicated shape in order to correct the coma aberration. As a result, the non-arc-shaped lens surface (in the main scanning cross-section) tends to become more difficult to form.

According to this embodiment, therefore, the width W3 (in the main scanning direction) of the region B through which the light beam incident at the maximum image height (Y=−107 mm) passes on the non-arc-shaped lens surface (in the main scanning cross-section) of the correcting lens 64 provided in the incident optical system 5 is adjusted to at least 1.8 times the width W4 (in the main scanning direction) of the region A through which the light beam passes on the lens surface that causes coma aberration in the focusing optical system 8. Accordingly, the wavefront aberration can be excellently corrected with no increased difficulty in forming the non-arc lens surface (in the main scanning cross-section) of the correcting lens 64.

Specific values in this embodiment are described below. For a light beam incident on the maximum image height (Y=−107 mm), in this embodiment, the width of a region through which the light beam passes on a second surface (light-exiting surface) of the correcting lens 64, namely W3, is 2.63 mm. The width of the region through which the light beam passes on the second surface (light-exiting surface) of the toric lens 8 in the focusing optical system 8, namely W4, is 1.30 mm. Accordingly, the width W3 of the light beam on the non-arc-shaped surface (in the main scanning cross-section) of the correcting lens 64 is larger than the width W4 of the light beam on the lens surface that causes coma aberration in the focusing optical system 8, namely W3/W4=2.02, so that the coma aberration is excellently corrected.

In this embodiment, only the second surface (light-exiting surface) of the correcting lens 64 has a non-arc shape in the main scanning cross-section. For a non-arc-shaped first surface (light-entering surface) in addition to the non-arc-shaped second surface (light-exiting surface) in the main scanning cross-section, the same effect as above can be achieved by adjusting the ratio of W3/W4 to 1.8 or more, where W3 is defined as the highest value among the widths of the regions through which the light beam pass on the individual lens surfaces. Accordingly, the aberration can be excellently corrected, and thus excellent spots can be achieved.

In this embodiment, additionally, only the second surface (light-exiting surface) of the toric lens 8 causes coma aberration in the focusing optical system 8. For a plurality of lens surfaces that cause coma aberration in the focusing optical system 8, the same effect as above can be achieved by adjusting the ratio of W3/W4 to 1.8 or more, where W4 is defined as the highest value among the widths of the regions through which the light beam pass on the individual lens surfaces. Accordingly, the coma aberration can be excellently corrected, and thus excellent spots can be achieved.

The largest coma aberration in the focusing optical system 8 tends to occur at the maximum image height; therefore, the aberration can be excellently corrected not only at the maximum image height but also at intermediate image heights by adjusting the ratio of W3/W4 to 1.8 or more at the maximum image height.

Though the correcting lens 64 is composed of an aspherical lens having a non-arc shape in the main scanning cross-section in this embodiment, the structure thereof is not limited to that arrangement; for example, the correcting lens 64 can also be composed of a plurality of aspherical lenses. In addition, though a single-pass structure is used in this embodiment, the structure used is not limited to a single-pass structure; for example, a double-pass structure can be used. Furthermore, though the focusing optical system 8 is composed of a single toric lens in this embodiment, the structure thereof is not limited to that arrangement; for example, the focusing optical system 8 can be composed of a plurality of lenses. In this case, a sufficient effect can be achieved if an aberration occurs in the focusing optical system 8.

Though a light beam impinges on the polygon mirror 6 from the front thereof (front incidence) in the main scanning cross-section in the first and second embodiments, the incidence angle is not limited to a right angle; it can instead be an oblique angle. In the first and second embodiments, additionally, the focusing optical system 8 includes a toric lens having a non-arc shape in the main scanning cross-section, and the correcting lens 64, which has a non-arc shape in the main scanning cross-section, can be provided in the incident optical system 5.

Third Embodiment

Figure 16:
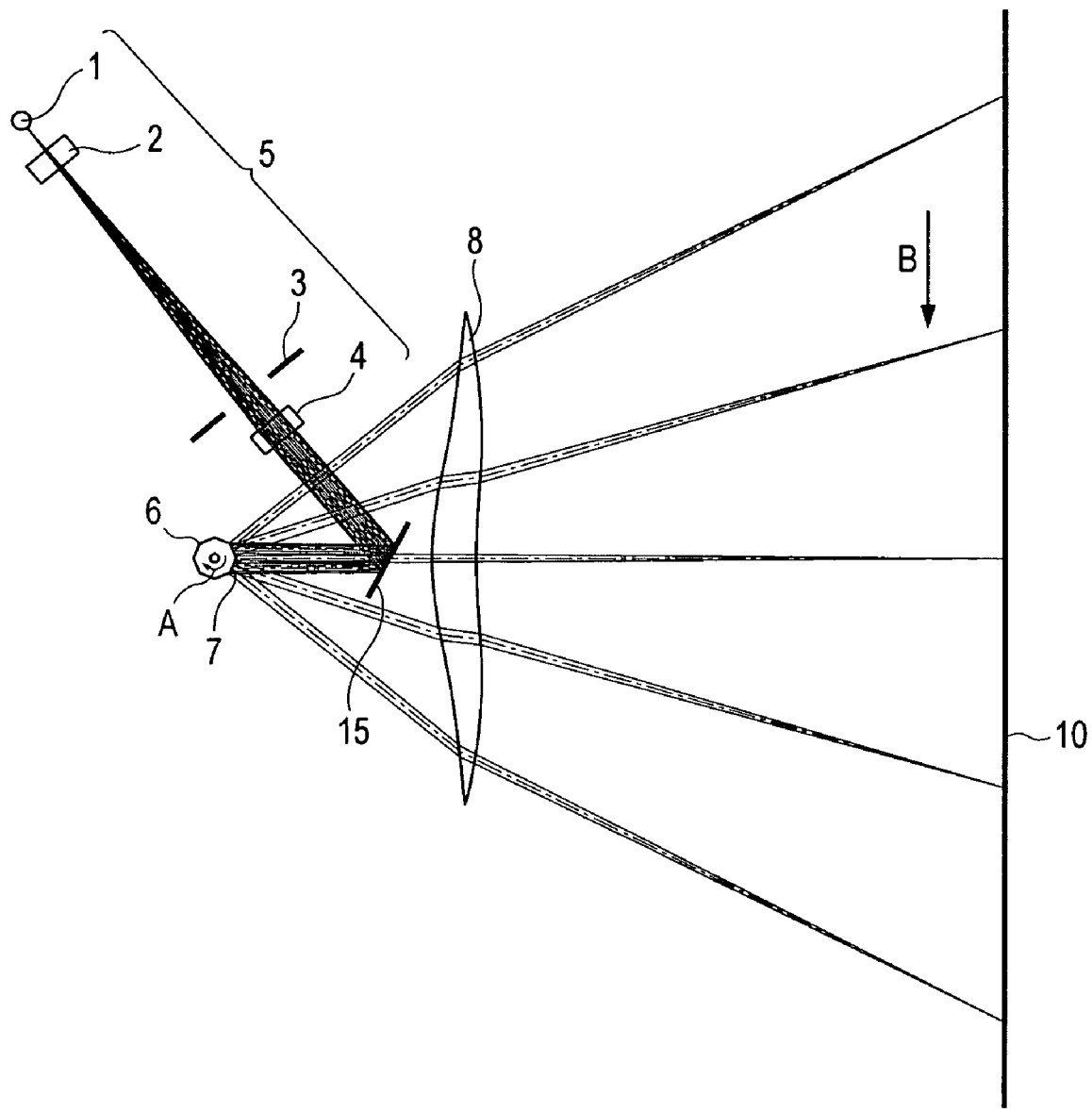
FIG. 16 is a main scanning cross-sectional view of an optical scanner according to a third embodiment of the present invention.
Figure 17:
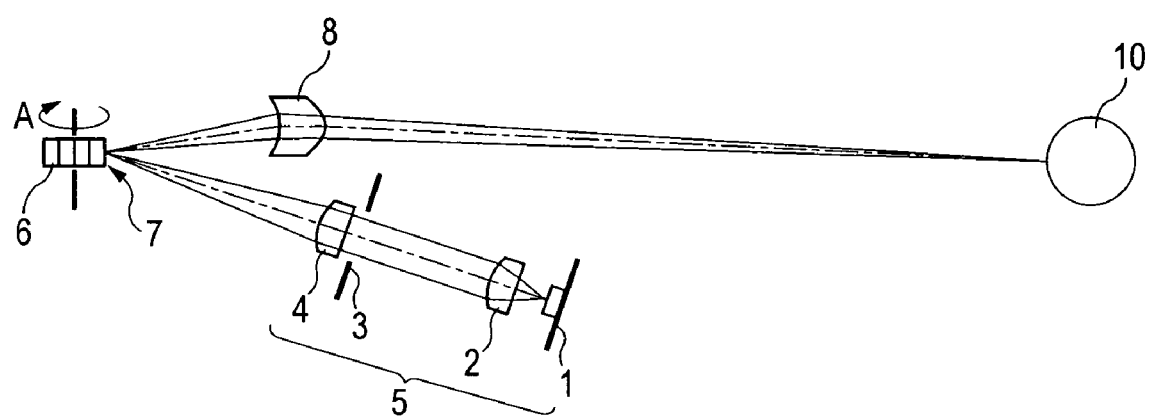
FIG. 17 is a sub-scanning cross-sectional view of the optical scanner according to the third embodiment of the present invention.

FIG. 16 is a sectional view of the main part of an optical scanner according to a third embodiment of the present invention in a main scanning direction (a main scanning cross-sectional view). FIG. 17 is a sectional view of the main part of the optical scanner in FIG. 16 in a sub-scanning direction (a sub-scanning cross-sectional view). In FIG. 17, a beam-folding mirror 15 for allowing a light beam to impinge on the polygon mirror 6 in FIG. 16 is not shown. In FIGS. 16 and 17, the same reference numerals as in FIGS. 1 and 2 indicate the same components.

The third embodiment is different from the first embodiment in that the F-number on the incident side in the main scanning direction in the incident optical system 5 is lower than that in the first embodiment, namely 7, that the focusing optical system 8 is composed of a single toric lens 8, and that the light beam reflected and deflected by the polygon mirror 6 is adjusted to a weakly convergent light beam to reduce the thickness of the toric lens 8 in the main-scanning cross-section. In the main scanning cross-section, both the light-entering surface and the light-exiting surface of the toric lens 8 have a non-arc shape. In the sub-scanning cross-section, the light-entering surface of the toric lens 8 has an arc shape with negative power, and the light-exiting surface thereof has an arc shape with positive power. Another difference is the use of a single-pass structure in which only the light beam reflected by any deflecting surface 7 of the polygon mirror 6 passes through the toric lens 8, that is, in which the light beam incident on the deflecting surface 7 of the polygon mirror 6 does not pass through the toric lens 8. The other structures and optical operations are substantially the same as those in the first embodiment, and thus the same effect can be achieved.

Table 5 shows the properties of the focusing optical system 8 in this embodiment. Table 6 shows data (R, D, and N) of the focusing optical system 8 in this embodiment. Table 7 shows aspherical shapes in this embodiment.

Table 8 shows the individual values in the above equations (9) to (12) for the individual surfaces through which a light beam incident at a maximum image height Y=−107 mm passes in this embodiment. In Table 8, A=2.3E-4, B=−3.6E-4, and thus B/A=−1.55<0, meaning that the equation (9) is satisfied. In addition, the shapes of the lens surfaces are adjusted so that the equation (10') is satisfied. That is, because ρm=0.06 mm and f=151.4 mm, f·|A+B|=0.019<ρm=0.060 (mm)

A is a positive value and B is a negative value in this embodiment while A is a negative value and B is a positive value in the first embodiment. Nevertheless, because the lens shapes are adjusted so that the equations (9) to (12) are satisfied, as in the first embodiment, the asymmetrical component H' (=A+B) caused in the phase shape of the wavefront aberration by the overall optical system (the incident optical system 5 and the focusing optical system 8) in the optical scanner with the chief ray of the light beam as the central axis can be reduced to achieve focused spots with an excellent shape.

TABLE 5

| Laser power | E | 5 | (mW) |
| Number of light-emitting points | N | 2 | |
| Interval between light-emitting points | $d_1$ | 90 | (μm) |
| Wavelength used | λ | 790 | (nm) |
| Incident F-number in main scanning direction | Fm | 7 | — |
| Incident F-number in sub-scanning direction | Fs | 6.4 | — |

TABLE 5-continued

| | | | |
|---|---|---|---|
| Focal length of cylindrical lens 2 | fs | 10.01 | (mm) |
| Focal length of collimating lens 4 | Fcol | 39.18 | (mm) |
| Full length of incident optical system 5 | Lo | 115.1 | (mm) |
| Width of deflecting surface 7 in main scanning direction | W | 2.85 | (mm) |
| Effective light beam width in main scanning direction | Wo | 5.02 | (mm) |
| Diameter of circle circumscribing polygon mirror 6 | φ₁ | 7.4 | (mm) |
| Diameter of circle inscribed in polygon mirror 6 | φ₂ | 6.84 | (mm) |
| Number of deflecting surfaces 7 of polygon mirror 6 | M | 8 | (surfaces) |
| Scanning efficiency | Du | 90 | (%) |
| Maximum scanning angle | ±α | 40.5 | (deg) |
| Magnification of focusing optical system 8 in sub-scanning direction | βs | 2 | (times) |
| Effective scanning width | 2Yo | 214 | (mm) |
| Diameter of focused spot in main scanning direction | ρm | 60 | (μm) |

TABLE 7

| | | Incident optical system Cylindrical lens 2 | Focusing optical system toric lens 8 | |
|---|---|---|---|---|
| | | 3rd surface | 7th surface | 8th surface |
| Shape of generating line | R | ∞ | 7.7956E+01 | 1.6946E+02 |
| | K | 0 | −7.2950E+00 | −2.1925E+00 |
| | B4 | 0 | −1.8300E−06 | −2.6462E−06 |
| | B6 | 0 | 7.0718E−10 | 7.2982E−10 |
| | B8 | 0 | −1.4905E−13 | −1.4716E−13 |
| | B10 | 0 | 1.5955E−17 | 1.7906E−17 |
| Shape of line perpendicular to generating line | r | −7.33E+00 | −1.781E+01 | −1.124E+01 |
| | D2 | 0 | 1.289E−03 | 4.824E−04 |
| | D4 | 0 | 6.317E−07 | −9.092E−08 |
| | D6 | 0 | 9.189E−11 | 2.427E−11 |
| | D8 | 0 | −8.188E−15 | 6.829E−15 |
| | D10 | 0 | 7.301E−17 | −2.906E−18 |

TABLE 8

| | Incident optical system | | | | Focusing optical system | |
|---|---|---|---|---|---|---|
| | Cylindrical lens 2 | | Collimating lens 4 | | toric lens 8 | |
| Surface number | 2 | 3 | 4 | 5 | 7 | 8 |
| Ui | −1 | 1 | −1 | 1 | −1 | 1 |
| ni | 1.762 | 1.762 | 1.524 | 1.524 | 1.524 | 1.524 |
| Position through which upper ray passes (with respect to optical axis in generating line direction) | −0.38 | −0.58 | −2.91 | −3.10 | −45.60 | −47.06 |
| ai | 0 | 0 | 0 | 0.104 | −0.119 | 0.226 |
| Position through which chief ray passes (with respect to optical axis in generating line direction) | −0.18 | −0.27 | −1.37 | −1.46 | −44.11 | −45.74 |
| bi | 0 | 0 | 0 | 0.049 | −0.120 | 0.214 |
| Position through which lower ray passes (with respect to optical axis in generating line direction) | 0.02 | 0.03 | 0.17 | 0.18 | −42.58 | −44.38 |
| ci | 0 | 0 | 0 | −0.006 | −0.122 | 0.199 |
| Ui(ni − 1) x{\|ai − bi\| − \|bi − ci\|} | 0.0E+00 | 0.0E+00 | 0.0E+00 | 2.3E−04 | 7.4E−04 | −1.1E−03 |
| | | | A = 2.3E−04 | | B = −3.6E−04 | |

TABLE 5-continued

| | | | |
|---|---|---|---|
| Diameter of focused spot in sub-scanning direction | ρs | 70 | (μm) |
| Natural convergence point (polygon mirror 6 to convergence point) | L0 | 302.3 | (mm) |

TABLE 6

| | Surface | R | D | N |
|---|---|---|---|---|
| Light-emitting points of semiconductor laser 1 | 1st surface | | 5.29 | 1 |
| Cylindrical lens 2 | 2nd surface | ∞ | 5 | 1.762 |
| | 3rd surface | Table 7 | 32.80 | 1 |
| Collimating lens 4 | 4th surface | ∞ | 5 | 1.762 |
| | 5th surface | −29.86 | 66.97 | 1 |
| Deflecting surfaces 7 of polygon mirror 6 | 6th surface | ∞ | 44.45 | 1 |
| toric lens 8 | 7th surface | Table 7 | 10.7 | 1.522 |
| | 8th surface | Table 7 | 119.47 | 1 |
| Surface to be scanned 10 | 9th surface | ∞ | | |

Figure 9:
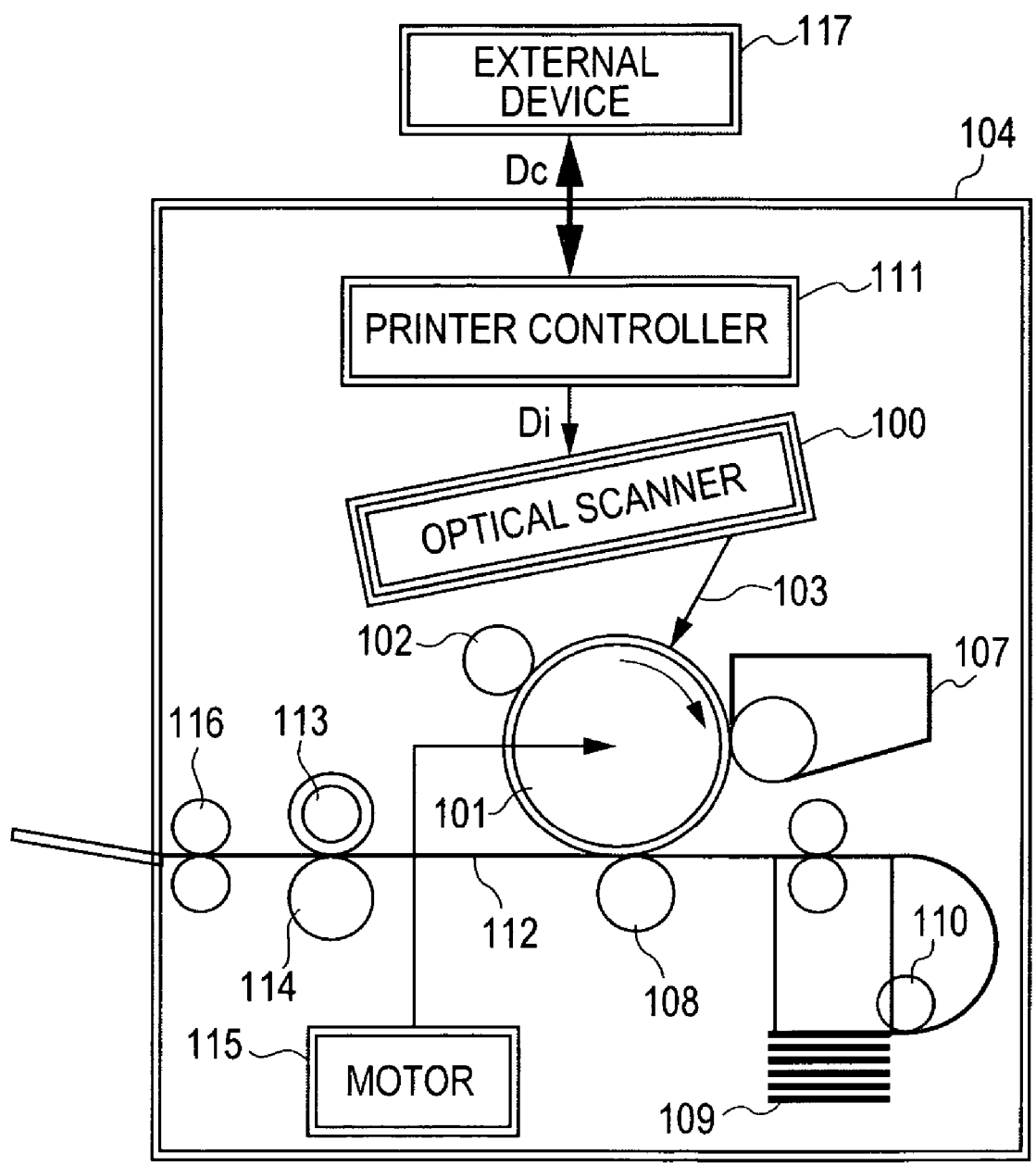
FIG. 9 is a sub-scanning cross-sectional view of an image forming apparatus according to an embodiment of the present invention.

FIG. 9 is a sectional view of the main part of an image forming apparatus according to an embodiment of the present invention in the sub-scanning direction. In FIG. 9, an external device 117, such as a personal computer, inputs code data Dc to an image forming apparatus 104. A printer controller 111 in the apparatus 104 converts the code data Dc into image data (dot data) Di which is then input to an optical scanner 100 having the structure shown in the first or second embodiment. The optical scanner 100 emits a light beam 103 modulated according to the image data Di to scan the photosensitive surface of a photosensitive drum 101, as a member for bearing an electrostatic latent image (photosensitive member), in the main scanning direction.

A motor 115 rotates the photosensitive drum 101 clockwise to move the photosensitive surface thereof in the sub-scanning direction, which is a direction orthogonal to the main scanning direction, with respect to the light beam 103. A charging roller 102 is brought into contact with the photosensitive surface of the photosensitive drum 101 on the upper side thereof to uniformly charge the photosensitive surface. The photosensitive surface charged by the charging roller 102 is scanned by the light beam 103 emitted from the optical scanner 100.

The light beam 103, which is modulated according to the image data Di, as described above, scans the photosensitive surface to form an electrostatic latent image on it. The electrostatic latent image is developed into a toner image by a developing unit 107 brought into contact with the photosensitive drum 101 downstream of the scanning position of the light beam 103 in the rotational direction of the photosensitive drum 101.

The toner image developed by the developing unit 107 is transferred to a sheet of paper 112, as a transfer material, by a transfer roller 108 provided on the lower side of the photosensitive drum 101 such that they are opposed to each other. Sheets of paper 112 are stored in a sheet cassette 109 provided in front of the photosensitive drum 101 (on the right side in FIG. 9), though they may also be manually fed. A feeding roller 110 is provided at an end of the sheet cassette 109 to feed the sheets of paper 112 into a carrier line.

The sheet of paper 112 having the unfused toner image is then carried to a fusing unit disposed on the backside of the photosensitive drum 101 (on the left side in FIG. 9). The fusing unit includes a fusing roller 113 having an internal fusing heater (not shown) and a pressure roller 114. The fusing roller 113 and the pressure roller 114 form a nip. The sheet of paper 112 carried from the transfer roller 108 is pressed and heated at the nip between the fusing roller 113 and the pressure roller 114 to fuse the unfused toner image on the sheet of paper 112. The sheet of paper 112 having the fused image is ejected from the image forming apparatus 104 by an ejecting roller 116 to the rear of the fusing roller 113.

The printer controller 111 not only converts data, as described above, but also controls the individual units in the image forming apparatus 104, such as the motor 115 and a motor for the polygon mirror in the optical scanner 100, though the control function is not shown in FIG. 9.

The recording density of the image forming apparatus used in the present invention is not particularly limited. The first and second embodiments of the present invention, however, have a more significant effect for image forming apparatuses with recording densities of 1,200 dpi or more bearing in mind that higher image quality is required with increasing recording densities.

[Color Image Forming Apparatus]

Figure 10:
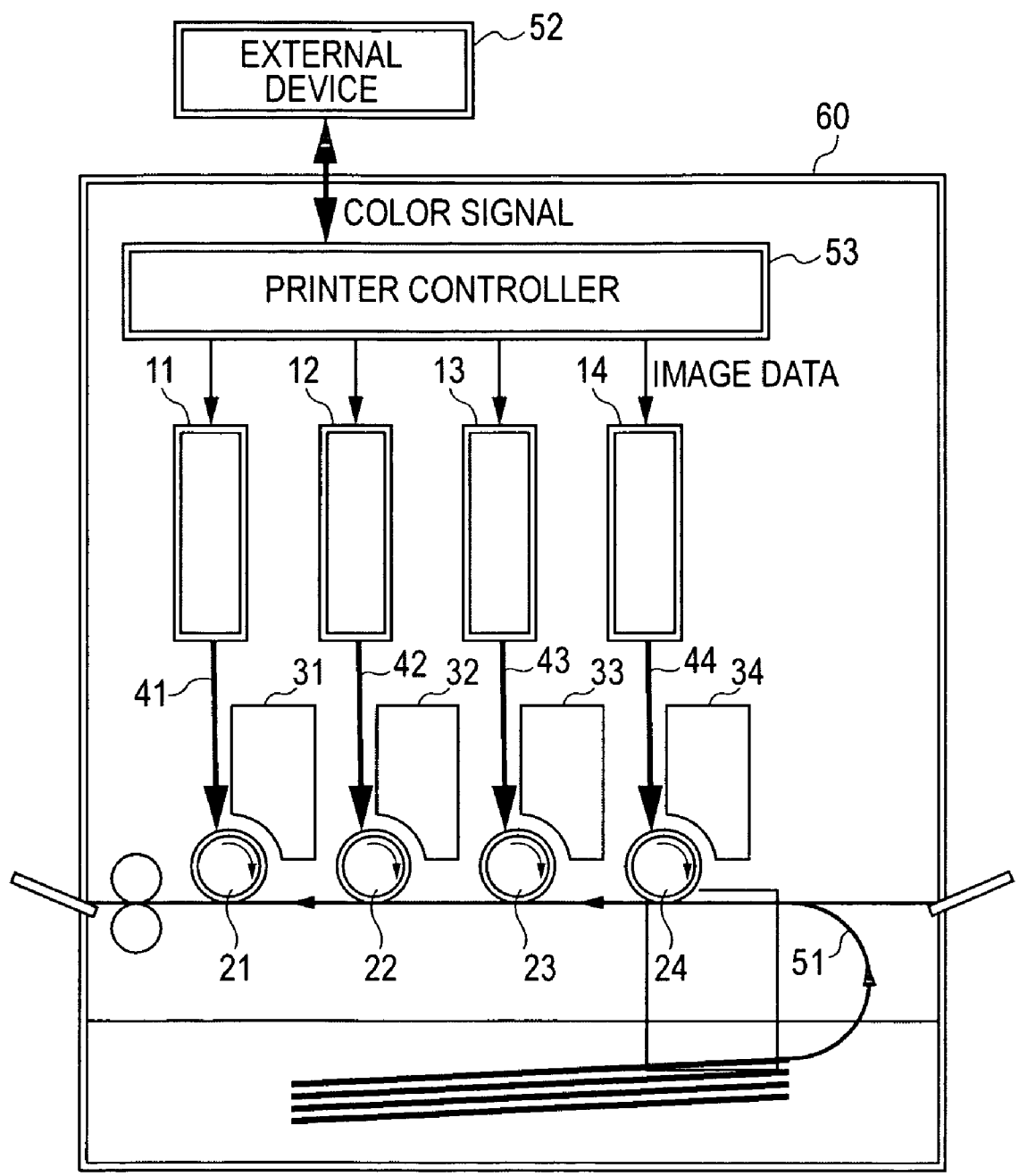
FIG. 10 is a diagram of the main part of a color image forming apparatus according to an embodiment of the present invention.
Figure 11:
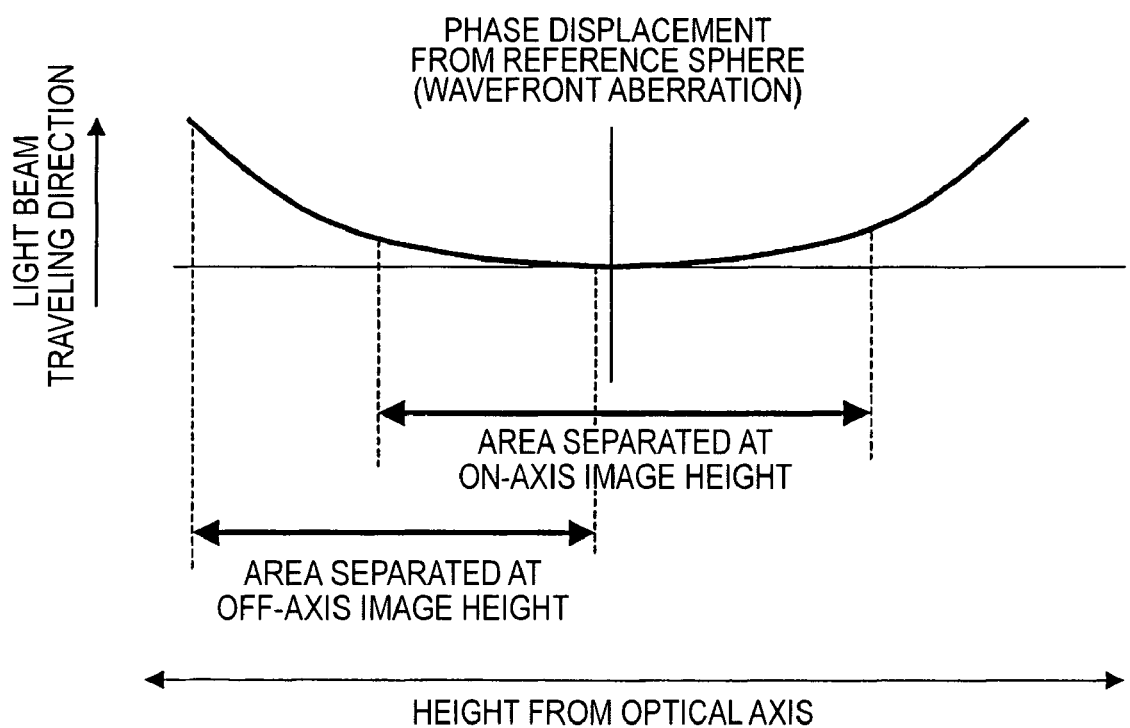
FIG. 11 is a diagram of the wavefront aberration of a light beam incident on a light deflector in the main scanning direction.
Figure 12A:
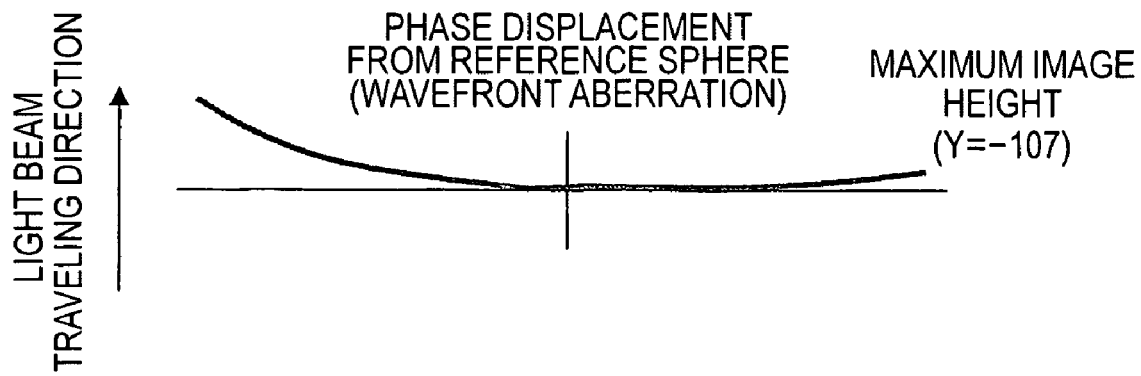
FIGS. 12A, 12B, and 12C are diagrams showing wavefront aberrations caused in the main scanning direction at an off-axis image height by an incident optical system, a focusing optical system, and the overall system, respectively, in a known OFS.
Figure 12B:
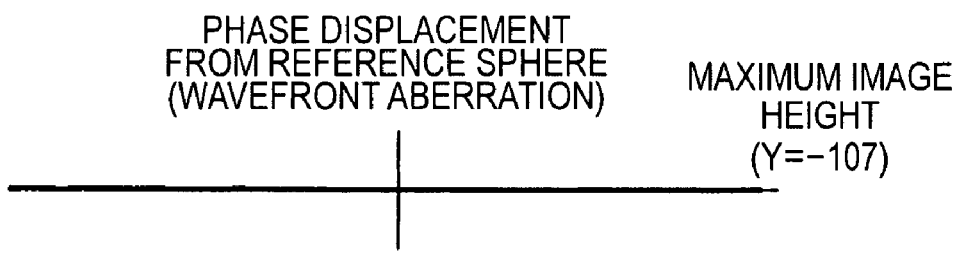
Figure 12C:
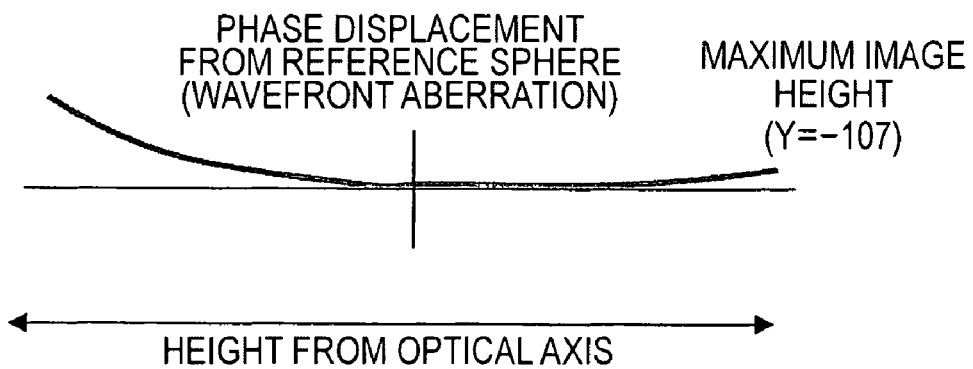
Figure 13A:
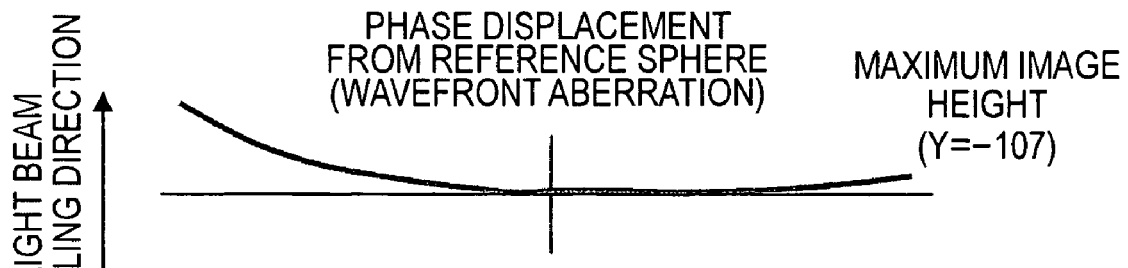
FIGS. 13A, 13B, and 13C are diagrams showing wavefront aberrations caused in the main scanning direction at an off-axis image height by an incident optical system, a focusing optical system, and the overall system, respectively, in a known OFS (including a scanning system composed of a single lens).
Figure 13B:
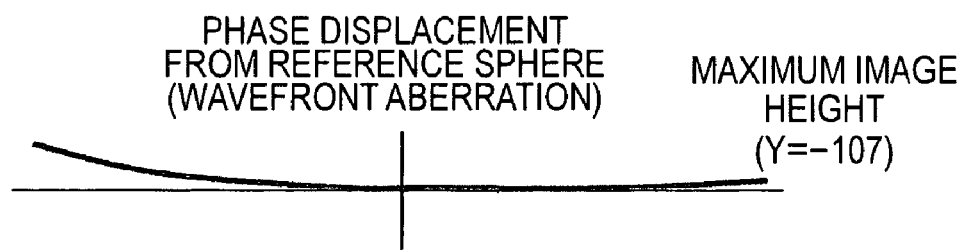
Figure 13C:
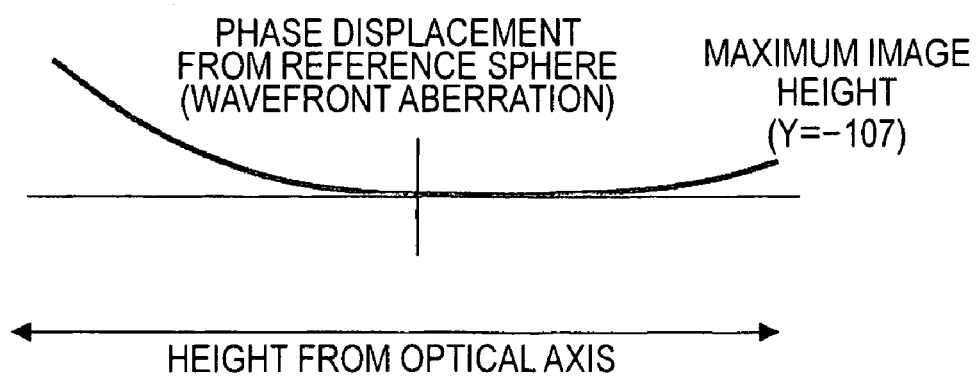
Figure 14:
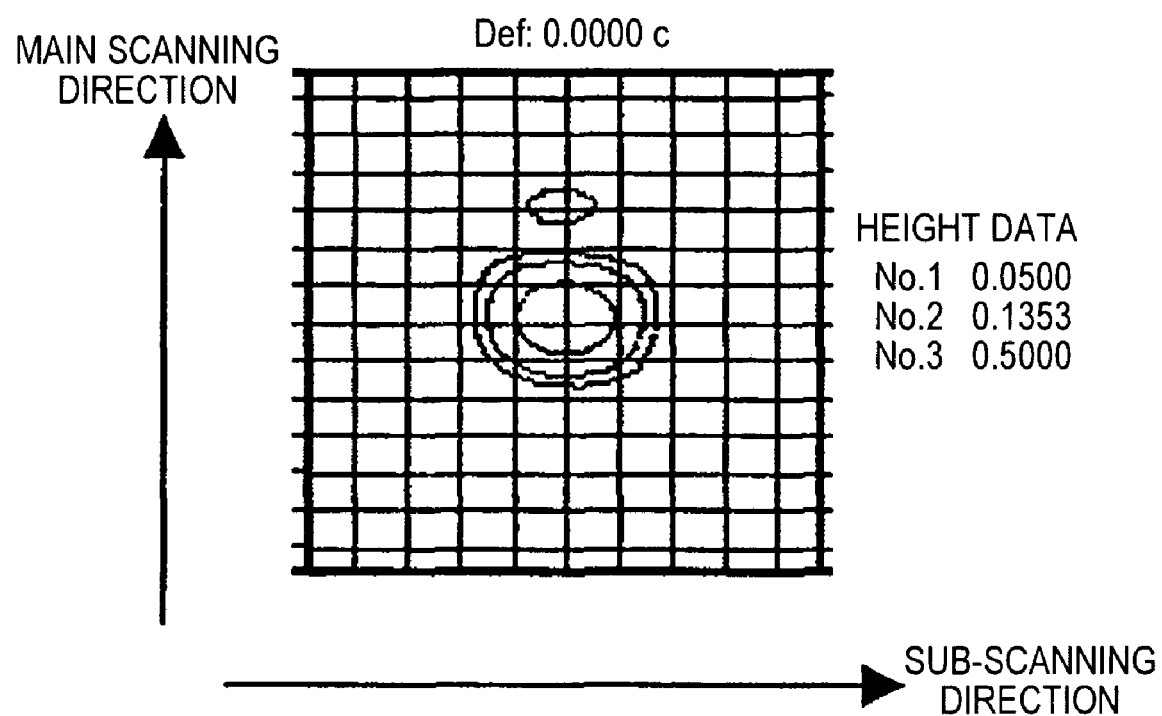
FIG. 14 is a spot diagram at an off-axis image height in the known OFS.

FIG. 10 is a sectional view of the main part of a color image forming apparatus according to an embodiment of the present invention. This color image forming apparatus is a tandem-type apparatus in which four optical scanners are arranged in tandem to record image information on the surfaces of photosensitive drums, as image-bearing members. In FIG. 10, a color image forming apparatus 60 includes optical scanners 11, 12, 13, and 14 having the structure shown in the first or second embodiment, photosensitive drums 21, 22, 23, and 24, as image-bearing members, developing units 31, 32, 33, and 34, and a carrier belt 51.

In FIG. 10, an external device 52, such as a personal computer, input color signals corresponding to R (red), G (green), and B (blue) to the color image forming apparatus 60. A printer controller 53 in the apparatus 60 converts the color signals into image data (dot data) corresponding to C (cyan), M (magenta), Y (yellow), and B (black). The image data is then input to the optical scanners 11, 12, 13, and 14, which emit light beams 41, 42, 43, and 44 modulated according to the image data to scan photosensitive surfaces of the photosensitive drums 21, 22, 23, and 24, respectively, in the main scanning direction.

In the color image forming apparatus 60 in this embodiment, the optical scanners 11, 12, 13, and 14 are arranged in tandem and correspond to C (cyan), M (magenta), Y (yellow), and B (black), respectively. The optical scanners 11, 12, 13, and 14 record image signals (image information) on the surfaces of the photosensitive drums 21, 22, 23, and 24, respectively, to print a color image at high speed.

In the color image forming apparatus 60 in this embodiment, as described above, the optical scanners 11, 12, 13, and 14 emit the light beams 41, 42, 43, and 44, respectively, according to the image data to form latent images of the individual colors on the corresponding photosensitive drums 21, 22, 23, and 24. The images are superimposed on a recording material to form a full-color image.

The external device 52 used can be, for example, a color image reader having a CCD sensor; in this case, the color image reader and the color image forming apparatus 60 constitute a color digital copier.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Laid-Open No. 2004-270051, filed Sep. 16, 2004, which is hereby incorporated by reference herein in its entirety.

What is claimed is:

1. An optical scanner comprising:
   a light source that emits a light beam;
   a light deflector on which the light beam impinges;
   an incident optical system that allows the light beam to impinge on the light deflector such that the width of the light beam incident on the light deflector in the main scanning direction is larger than the width of each deflecting surface of the light deflector in the main scanning direction; and
   a focusing optical system that guides the light beam deflected by the light deflector to a surface to be scanned,
   wherein one or more optical surfaces having a non-arc shape in a main scanning cross-section are provided in at least either the incident optical system or the focusing optical system such that a first direction of aberration is opposite to a second direction of aberration,
   the first direction being the direction of the phase difference in wavefront aberration in the main scanning direction between the chief ray of the light beam and the marginal rays of the light beam, the phase difference occurring when the light beam incident on the surface to be scanned at the maximum image height passes through the incident optical system,
   the second direction being the direction of another phase difference in wavefront aberration in the main scanning direction between the chief ray of the light beam and the marginal rays of the light beam, the phase difference occurring when the light beam incident on the surface to be scanned at the maximum image height passes through the focusing optical system.

2. The optical scanner according to claim 1, wherein the phase shape of the wavefront aberration occurring when the light beam incident on the surface to be scanned at the maximum image height passes through the incident optical system is asymmetrical in the main scanning direction with the chief ray of the light beam as the center of the phase shape.

3. The optical scanner according to claim 1, wherein the phase shape of the wavefront aberration occurring when the light beam incident on the surface to be scanned at the maximum image height passes through the focusing optical system is asymmetrical in the main scanning direction with the chief ray of the light beam as the center of the phase shape.

4. The optical scanner according to claim 1,
wherein the one or more optical surfaces having a non-arc shape in the main scanning cross-section are provided in the focusing optical system; and
the largest width (W1) in the main scanning direction among the widths of the light beam incident at the maximum image height on the optical surfaces having a non-arc shape in the main scanning cross-section that are provided in the focusing optical system and the largest width (W2) in the main scanning direction among the widths of the light beam incident at the maximum image height on one or more optical surfaces having an arc shape in the main scanning cross-section that are provided in the incident optical system satisfy W1/W2≧1.8.

5. The optical scanner according to claim 1,
wherein the one or more optical surfaces having a non-arc shape in the main scanning cross-section are provided in the incident optical system; and
the largest width (W3) in the main scanning direction among the widths of the light beam incident at the maximum image height on the optical surfaces having a non-arc shape in the main scanning cross-section that are provided in the incident optical system and the largest width (W4) in the main scanning direction among the widths of the light beam incident at the maximum image height on one or more optical surfaces provided in the focusing optical system satisfy W3/W4≧1.8.

6. The optical scanner according to claim 1, wherein, when the incident optical system has m optical surfaces (m≧1), the focusing optical system has p optical surfaces (P≧1), the optical surfaces in the incident optical system are the first to m-th surfaces from the light source side, and the optical surfaces in the focusing optical system are the (m+1)-th to (p+m+1)-th surfaces from the light deflector side, the following equations are satisfied:

$$f \times |A + B| \leq \rho m$$

$$A = \sum_{i=1}^{m} [Ui \times (ni - 1) \times \{|ai - bi| - |bi - ci|\}]$$

$$B = \sum_{i=m+1}^{p+m+} [Ui \times (ni - 1) \times \{|ai - bi| - |bi - ci|\}]$$

wherein
B/A<0;
Ui is a coefficient that is −1 for a light-entering transparent optical surface and that is +1 for a light-exiting transparent optical surface or a reflective optical surface;
ni is a coefficient that equals the refractive index of glass for a transparent optical surface and that is 2 for a reflective optical surface;
ai is the gradient dX/dY of the i-th optical surface at the position through which a marginal ray, adjacent to an end of the optical surface, of the light beam incident at the maximum image height passes with respect to the optical axis of the optical surface in the main-scanning cross-section;
bi is the gradient dX/dY of the i-th optical surface at the position through which the chief ray of the light beam incident at the maximum image height passes with respect to the optical axis of the optical surface in the main-scanning cross-section;
ci is the gradient dX/dY of the i-th optical surface at the position through which a marginal ray, adjacent to the optical axis of the optical surface, of the light beam incident at the maximum image height passes with respect to the optical axis of the optical surface in the main-scanning cross-section;
f is the focal length (mm) of the focusing optical system; and
ρm is the diameter (mm) of a focused spot on the surface to be scanned in the main scanning direction.

7. An image forming apparatus comprising:
the optical scanner according to claim 1;
a photosensitive member having the surface to be scanned;
a developing unit for developing an electrostatic latent image formed on the photosensitive member by a light beam emitted from the optical scanner to form a toner image;
a transfer unit for transferring the developed toner image to a transfer material; and
a fusing unit for fusing the transferred toner image on the transfer material.

8. An image forming apparatus comprising:
the optical scanner according to claim 1; and
a printer controller for converting code data input from an external device into image signals and inputting the image signals to the optical scanner.

9. A color image forming apparatus comprising:
a plurality of the optical scanners according to claim 1; and
image-bearing members for forming images having different colors, each having the surface to be scanned.

10. The color image forming apparatus according to claim 9, further comprising a printer controller for converting color signals input from an external device into image data corresponding to the different colors and inputting the image data to the optical scanners.

* * * * *